US011052338B2

(12) United States Patent
Morris et al.

(10) Patent No.: US 11,052,338 B2
(45) Date of Patent: Jul. 6, 2021

(54) SYSTEMS AND METHODS OF FILTERING PARTICULATE MATTER FROM A FLUID

(71) Applicants: Kirk S. Morris, Gurnee, IL (US); Chris Disher, Valparaiso, IN (US); Dylan Morris, Gurnee, IL (US)

(72) Inventors: Kirk S. Morris, Gurnee, IL (US); Chris Disher, Valparaiso, IN (US); Dylan Morris, Gurnee, IL (US)

(*) Notice: Subject to any disclaimer, the term of this patent is extended or adjusted under 35 U.S.C. 154(b) by 0 days.

(21) Appl. No.: 16/177,380

(22) Filed: Oct. 31, 2018

(65) Prior Publication Data
US 2019/0070542 A1 Mar. 7, 2019

Related U.S. Application Data

(63) Continuation-in-part of application No. 15/941,719, filed on Mar. 30, 2018, now Pat. No. 10,722,829, (Continued)

(51) Int. Cl.
*B01D 39/16* (2006.01)
*D04H 1/541* (2012.01)

(52) U.S. Cl.
CPC ...... *B01D 39/1623* (2013.01); *B01D 2239/02* (2013.01); *B01D 2239/064* (2013.01);
(Continued)

(58) Field of Classification Search
CPC ........ B01D 39/1623; B01D 2239/1225; B01D 2239/064; B01D 2239/1233;
(Continued)

(56) References Cited

U.S. PATENT DOCUMENTS 2,197,471 A 4/1940 Hooper
2,538,899 A 1/1951 Dodge et al.
(Continued)

FOREIGN PATENT DOCUMENTS

DE 102011016689 A1 12/2011

OTHER PUBLICATIONS

"Carding" Celanese Acetate. Complete Textile Glossary. New York, NY (2001).
(Continued)

*Primary Examiner* — Waqaas Ali
(74) *Attorney, Agent, or Firm* — Womble Bond Dickinson (US) LLP

(57) ABSTRACT

Systems and methods of filtering particulate matter from a fluid are provided. In one exemplary embodiment, a system for filtering particulate matter from a liquid comprises a filter having a filter housing, inlet and outlet ports, and compressible filter media with synthetic fibers. Further, the filter media is disposed in the housing between the inlet and outlet ports and is operable to filter particulate matter from the liquid. Also, a pressure difference between the inlet and outlet ports with the filter media disposed in the housing is no more than four pounds per square inch differential. In addition, the system includes a pump that is operationally coupled to the filter and operable to move the liquid through the filter media with a flux rate of at least eighteen gallons per minute per square foot of the filter media while operating at less than one electrical horsepower.

17 Claims, 22 Drawing Sheets

Related U.S. Application Data which is a continuation of application No. 14/986,411, filed on Dec. 31, 2015, now abandoned.

(60) Provisional application No. 62/106,991, filed on Jan. 23, 2015, provisional application No. 62/173,108, filed on Jun. 9, 2015, provisional application No. 62/579,860, filed on Oct. 31, 2017.

(52) U.S. Cl.
CPC ............... *B01D 2239/065* (2013.01); *B01D 2239/0618* (2013.01); *B01D 2239/0636* (2013.01); *B01D 2239/0695* (2013.01); *B01D 2239/1225* (2013.01); *B01D 2239/1233* (2013.01); *B01D 2239/1291* (2013.01); *D04H 1/541* (2013.01)

(58) Field of Classification Search
CPC .......... B01D 2239/02; B01D 2239/065; B01D 2239/0636; B01D 2239/0695; B01D 2239/0618; B01D 2239/1291; D04H 1/541

See application file for complete search history.

(56) References Cited

U.S. PATENT DOCUMENTS

| | | | |
|---|---|---|---|
| 3,017,239 A | 1/1962 | Rodman | |
| 3,065,505 A | 11/1962 | Pratt et al. | |
| 3,595,731 A | 7/1971 | Davies et al. | |
| 4,564,377 A | 1/1986 | Kocatas | |
| 5,240,610 A | 8/1993 | Tani et al. | |
| 6,169,045 B1 | 1/2001 | Pike et al. | |
| 7,223,347 B2 | 5/2007 | Boner et al. | |
| 7,476,632 B2 | 1/2009 | Olson et al. | |
| 2004/0211160 A1 | 10/2004 | Rammig et al. | |
| 2009/0218292 A1* | 9/2009 | Mitchell | B01D 39/1623 210/694 |
| 2010/0319543 A1 | 12/2010 | Witsch et al. | |
| 2013/0125346 A1 | 5/2013 | Griggs et al. | |
| 2014/0026909 A1 | 1/2014 | Sebastian | |
| 2016/0271540 A1 | 9/2016 | Nielsen | |
| 2018/0221799 A1 | 8/2018 | Morris | |

OTHER PUBLICATIONS

"Sliver" Celanese Acetate. Complete Textile Glossary, New York, NY (2001).

Definition of sliver by Merriam-Webster, https://www.merriamwebster/dictionary/sliver.

Textile Institute, The, Textile Terms and Definitions, 6th Edition, 1970, McCorquoudale Printers, Ltd. Newton-le-Willows, selected pages.

"Tow" Celanese Acetate. Complete Textile Glossary, New York, NY (2001).

Celanese Acetate 2001 "Complete Textile Glossary" select definitions (Year: 2001).

* cited by examiner

1300

1301

FILTER, BY A FILTER MEDIUM, PARTICULATE MATTER FROM A FLUID, WHEREIN THE FILTER MEDIUM INCLUDES A NONWOVEN SLIVER FORMED INTO A PREDETERMINED SHAPE AND COMPOSED OF FIRST SYNTHETIC STAPLE FIBERS HAVING A FIRST DENIER, SECOND SYNTHETIC STAPLE FIBERS HAVING A SECOND DENIER, AND THIRD SYNTHETIC STAPLE FIBERS HAVING A THIRD DENIER

| Filter Media | Flush Volume (ml) | No. of Filter Balls for Analysis | Number of Fibers Migrated with Dimensions of ≥ 100μm x 10μm |
|---|---|---|---|
| One embodiment of a filter medium as disclosed herein 1401 | 18,990 ml | 6 | 71 |
| Fibalon® Pool media 1403 | 18,990 ml | 6 | 1,382 |
| polyBalls media 1405 | 18,990 ml | 6 | 1,422 |

| Product Specification | Media Types | | | | |
|---|---|---|---|---|---|
| | FilterBalls™ | #20 Sand | Multi-Media | Mystic White | Zeolite | Cartridge |
| Micron Rating (nominal) | 05 - 15μm | 35μm | 25μm | 30μm | 5-20μm | Various |
| Initial Pressure Drop (Δp) | < 1 psid | 7-15 psid | 5 - 10 psid | 7 - 15 psid | 10 - 15 psid | 3 - 7 psid |
| Weight /ft³ Dry | 1 Lbs | 100 Lbs | 90 - 110 Lbs | 105 Lbs | 50 Lbs | 1 - 3 Lbs |
| Weight /ft³ Wet | 1.1 Lbs | 150 - 175 Lbs | 150 - 175 Lbs | 150 - 175 Lbs | 80 Lbs | 1 - 4 Lbs |
| Flux Rate / ft² Media | 7 - 30 gpm | 3 - 10 gpm | 3 - 10 gpm | 3 - 10 gpm | 12-20 gpm | |
| Hygroscopy | Available in all conformities | Hydrophilic | Hydrophilic | Hydrophilic | Hydrophilic | Hydrophobic |
| Depth vs. Surface | Depth | Depth | Depth | Depth | Depth | Surface |
| Dirt Holding Void Space | 80% | 30 - 40 % | 30 - 40 % | 30 - 40 % | 40 - 50% | N/A |
| Energy Efficiency | 95% | 60% | 65% | 60% | 60% | 40% |
| Tendancy for Clumping | No | Yes | Yes | Yes | Yes | N/A |
| Tendancy to blind off | No | Yes | Yes | Yes | Yes | Yes |
| Recyclable | Yes | No | No | No | No | No |
| Environmental Concerns | None | Yes, silica dust | Yes, silica dust | Yes, silica dust | Yes, hazardous dust | No |
| Freeze Resistant | Yes | No | No | No | No | No |
| Backwashable | Yes | Yes | Yes | Yes | Yes | No |
| Chemical Resistance | Yes | Yes | Yes | Yes | Yes | Can be |
| Lifetime | 4 - 5 years | 3-4 Years | 3 - 4 Years | 3 - 4 Years | 2-3 Years | 1 - 3 months |

FIG. 16

| Media | Setting | Pressure (PSI) | Flow (GPM) | Hours to turn | Kilowatts | Cost per turn | Monthly power cost |
|---|---|---|---|---|---|---|---|
| Sand 24 hour Operation | High: 3450 RPM | 12 | 42.3 | 11 | .966 | $1.66 | $104 |
| FilterBalls 24 hour operation | Low: 2000 RPM | 1 | 47.1 | 10 | .345 | $.53 | $37 |
| FilterBalls 12 hours operation then off | Low: 2000 RPM | 1 | 47.1 | 10 hrs of oper. = 1.2 turns per day | .345 | $.53 | $19 |

| Media | Setting | Pressure (PSI) | Flow (GPM) | Hours to turn | Kilowatts | Cost per turn | Monthly power cost |
|---|---|---|---|---|---|---|---|
| Sand 24 hour Operation | High: 3450 RPM | 12 | 43.1 | 5 | .966 | $0.67 | $104 |
| FilterBalls 24 hour operation | Low: 2000 RPM | 1 | 41.3 | 5 | .345 | $.25 | $37 |
| FilterBalls 6 hours operation then off | Low: 2000 RPM | 1 | 41.3 | 5 hrs of oper. = 1.2 turns per day | .345 | $.25 | $9 |

FILTER, BY A FILTER HAVING A FILTER HOUSING, INLET AND OUTLET PORTS AND COMPRESSIBLE FILTER MEDIA WITH SYNTHETIC FIBERS, PARTICULATE MATTER FROM THE LIQUID, WHEREIN THE FILTER MEDIA IS DISPOSED IN THE HOUSING BETWEEN THE INLET AND OUTLET PORTS AND IS OPERABLE TO FILTER PARTICULATE MATTER FROM THE LIQUID, WITH A PRESSURE DIFFERENCE BETWEEN THE INLET AND OUTLET PORTS WITH THE FILTER MEDIA DISPOSED IN THE HOUSING BEING NO MORELESS THAN FOUR POUNDS PER SQUARE INCH DIFFERENTIAL

2003

MOVE, BY A PUMP OPERATIONALLY COUPLED TO THE INLET PORT OF THE FILTER, THE LIQUID THROUGH THE FILTER MEDIA OF THE FILTER WITH A FLUX RATE OF AT LEAST EIGHTEEN GALLONS PER MINUTE PER SQUARE FOOT OF THE FILTER MEDIA WHILE OPERATING AT LESS THAN ONE ELECTRICAL HORSEPOWER

FIG. 20

SYSTEMS AND METHODS OF FILTERING PARTICULATE MATTER FROM A FLUID

CROSS REFERENCE TO RELATED APPLICATIONS

This application is a continuation-in-part of U.S. patent application Ser. No. 15/941,719, filed Mar. 30, 2018, which is a continuation of U.S. patent application Ser. No. 14/986,411, filed Dec. 31, 2015, which claims benefit to U.S. Prov. App. No. 62/106,991, filed Jan. 23, 2015, and U.S. Prov. App. No. 62/173,108, filed Jun. 9, 2015, which are all hereby incorporated by reference as if fully set forth herein. Further, this application claims priority to U.S. Prov. App. No. 62/579,860, filed Oct. 31, 2017, which is hereby incorporated by reference as if fully set forth herein.

FIELD OF DISCLOSURE

The present disclosure relates generally to filter media, and in particular to filtering particulate matter from a fluid.

BACKGROUND

Filter media is used in a filter for filtering matter such as particulate matter from fluids and includes media for air filters, chemical filters, coolant filters, hydraulic filters, oil filters, water filters, and the like. Further, filter media is used in many consumer and industrial filtration applications such as for drinking water, swimming pools, aquaculture, wastewater recycling, oil separation, and other applications. In one example, a filter media disposed in a cartridge filter filters water input at the top of the cartridge through a fluid inlet. The filter media then filters the water with the filtered water output through a fluid outlet.

A filter medium is fabricated from a diverse range of materials such as sand, glass, asbestos, natural fibers such as wood pulp and the like, and synthetic polymers such as thermoplastics and the like. Thermoplastics are a plastic material that becomes pliable or moldable above a certain temperature and solidifies during cooling. Thermoplastics may be used to form polymeric and non-polymeric thermoplastic fibers.

A filter medium is typically designed to provide a high filtering efficiency to prevent fine particulate matter from passing through while maintaining a low pressure drop across the medium over its useful life. Further, a filter medium is typically designed for an increased useful life while not requiring frequent cleaning or replacement. However, these design requirements tend to be inversely related, requiring design trade-offs. For instance, a medium having a high filtering efficiency tends to accumulate more particulate matter resulting in a high pressure drop. The loft or thickness of a filter medium typically indicates its ability to entrap particulate matter within the medium's interstitial spaces or pores without impeding the flow of a fluid through the medium. This filtration process is commonly known as depth filtration. In contrast, surface filtration accumulates particulate matter on a surface of a medium, building a high pressure drop across the medium.

There have been many attempts to develop a filter medium having high filter efficiency while maintaining a low pressure drop across the medium. One such attempt uses nonwoven material as a two-dimensional filter. For instance, a fluid having particulate matter flows through one side of the nonwoven material of a filter and a filtered fluid flows out of the other side of the nonwoven material. Further, the filtered particulate matter forms a filter cake on the nonwoven material, resulting in reducing the effectiveness of the filter and requiring a higher pumping power to maintain operation over a longer period. In addition, the use of nonwoven material as a filter material typically suffers from fiber migration, since the fibers do not always stay in their initial positions.

In another such attempt, nonwoven material has been constructed using hollow polyester fibers to form staple fibers. These staple fibers are used to form a single sliver, which may be rolled to form the filtered media. However, the staple fibers cause undesirable fiber migration. Also, the use of hollow fibers have less tensile strength and are prone to breaking, leading to increased fiber migration.

In another such attempt, a porous, compressible filter medium is disposed between compression plates to achieve desired filtration results. The compression plates are used to vary the density and denier (linear mass density) of the fibers of the filter medium. In addition to requiring the use of compression plates, this medium also suffers from a reduced capacity to hold particulate matter in the filter bed. Further, this medium is typically limited to an upflow filter systems.

Accordingly, there is a need for improved techniques relating to a filter medium having high filter efficiency while reducing filter migration and maintaining a low pressure drop across the medium and the manufacturing thereof. In addition, other desirable features and characteristics of the present disclosure will become apparent from the subsequent detailed description and claims, taken in conjunction with the accompanying figures and the foregoing technical field and background.

SUMMARY

The following presents a simplified summary of the disclosure in order to provide a basic understanding to those of skill in the art. This summary is not an extensive overview of the disclosure and is not intended to identify key or critical elements of embodiments of the disclosure or to delineate the scope of the disclosure. The sole purpose of this summary is to present some exemplary embodiments disclosed herein in a simplified form as a prelude to the more detailed description that is presented later.

The present disclosure relates to filter media having a single or multiple nonwoven slivers for filtering particulate matter from fluids and the manufacturing thereof. In one exemplary embodiment, a filter medium may be configured to include a nonwoven sliver having a predetermined density and formed into a predetermined shape for filtering particulate matter from a fluid. The nonwoven sliver may be composed of first synthetic staple fibers having a first staple fiber length and a first denier and second synthetic staple fibers having a second staple fiber length and a second denier. Further, a portion of the first synthetic staple fibers may be crimped with a portion of the second synthetic staple fibers.

In another exemplary embodiment, a filter medium may be configured to include a first nonwoven sliver composed of a first set of synthetic staple fibers having different staple fiber lengths and a first density. Further, the filter medium may be configured to include a second nonwoven sliver composed of a second set of synthetic staple fibers having different staple fiber lengths and a second density. The first nonwoven sliver and the second nonwoven sliver may be combined to form a predetermined shape having a core with a density of at least the first density. Also, the first density may be greater than the second density.

In another exemplary embodiment, a method of producing a filter medium for filtering a fluid may include constructing a first nonwoven sliver from a first set of synthetic staple fibers having different staple fiber lengths and a first density. Further, the method may include constructing a second nonwoven sliver from a second set of synthetic staple fibers having different staple fiber lengths and a second density. Also, the method may include combining the first nonwoven sliver and the second nonwoven sliver to obtain a combined material. Finally, the method may include forming the combined material into a predetermined shape to obtain the filter medium, wherein the filter medium has a core with substantially the first density. Also, the first density may be greater than the second density.

In another exemplary embodiment, a method of producing a thermal bonding of the non-woven fibers as a filter medium for filtering a fluid may include constructing a first nonwoven sliver from a first set of synthetic blended staple fibers having different staple fiber lengths and include single-component or bi-component fibers as binder fibers. Further, the method may include constructing a second nonwoven sliver from a second set of synthetic staple fibers to include single-component or bi-component fibers as binder fibers having different staple fiber lengths and a second density. Also, the method may include combining the first nonwoven sliver and the second nonwoven sliver to obtain a combined material. Finally, the method may include forming the combined material into a predetermined shape to obtain the filter medium, wherein the filter medium has a core with substantially the first density. Also, the first density may be greater than the second density.

In another exemplary embodiment, a filter for filtering a fluid may be configured to include a housing, a fluid inlet coupled to the housing, a fluid outlet coupled to the housing, and a filter media. The filter media may be configured to include a plurality of filter mediums disposed in the housing and may be used to filter the fluid from the fluid inlet and output the filtered fluid to the fluid outlet. Each of the filter mediums may be configured to include a first nonwoven sliver composed of a first set of synthetic staple fibers having different staple fiber lengths and a first density, and a second nonwoven sliver composed of a second set of synthetic staple fibers having different staple fiber lengths and a second density. Further, the first nonwoven sliver and the second nonwoven sliver may be combined to form a predetermined shape having a core with at least the first density. Also, the first density may be greater than the second density.

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure.

FIG. 13 is another embodiment of a method of filtering particulate matter from a fluid using a filter medium with various aspects described herein.

FIG. 14 is a table providing measurements of fiber migration of one embodiment of a filter medium as described herein compared to commercially available filter medium.

FIG. 16 is a table comparing the characteristics of the filter media disclosed herein with that of other filter media.

FIG. 17 is a table comparing the characteristics of a pool filtration system for a large pool using the filter media disclosed herein and the same pool filtration system using an equivalent volume of sand.

FIG. 18 is a table comparing the characteristics of a pool filtration system for a typical pool using the filter media disclosed herein and the same pool filtration system using an equivalent volume of sand.

FIG. 20 is a flowchart of one embodiment of a method of filtering particulate matter from a fluid in accordance with various aspects as described herein.

DETAILED DESCRIPTION

The following detailed description is merely illustrative in nature and is not intended to limit the present disclosure, or the application and uses of the present disclosure. Furthermore, there is no intention to be bound by any expressed or implied theory presented in the preceding field of use, background, or summary of the disclosure or the following detailed description. The present disclosure provides various examples, embodiments and the like, which may be described herein in terms of functional or logical block elements. Various techniques described herein may be used for filter media and the manufacture thereof. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Figure 1:
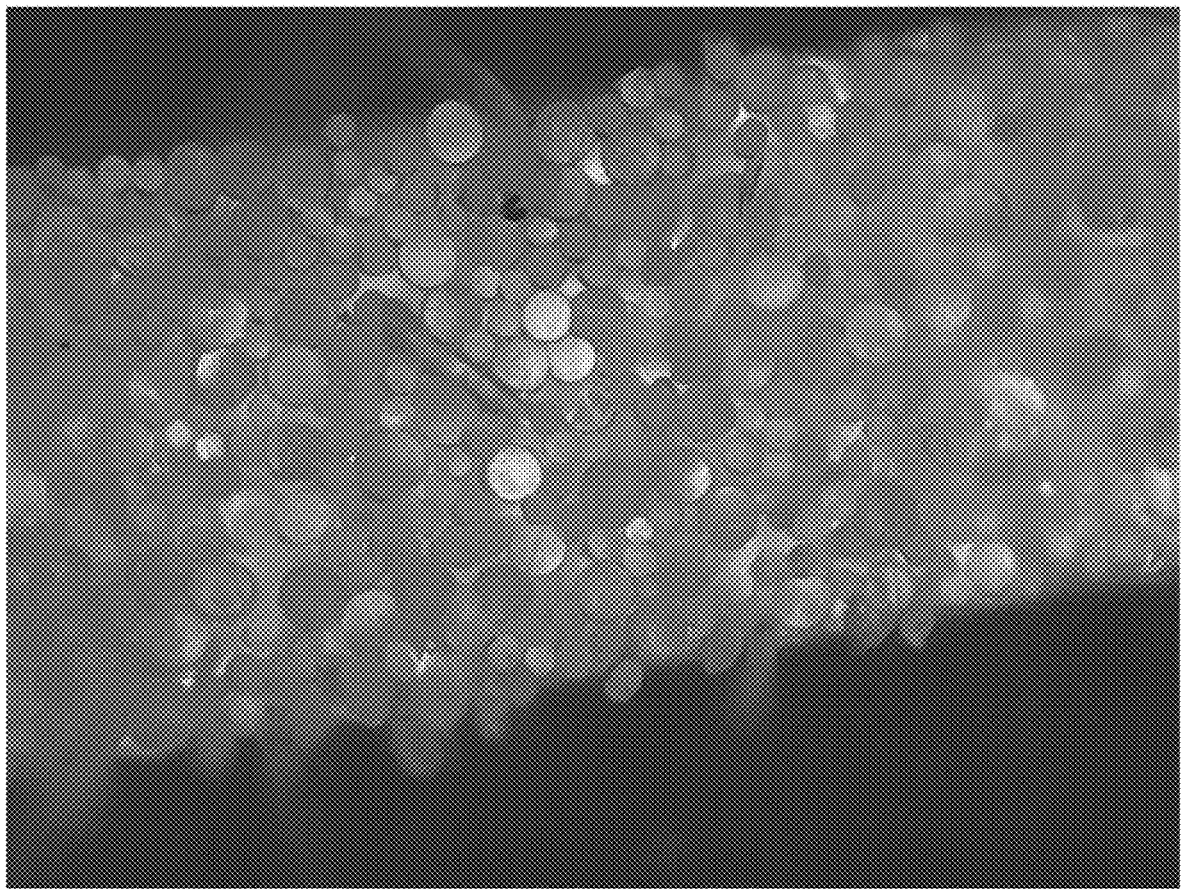
FIG. 1 is a cross-sectional view of one embodiment of a nonwoven sliver with various aspects described herein.

FIG. 1 is a cross-sectional view of one embodiment of a nonwoven sliver 100 with various aspects described herein. FIG. 1 shows that the nonwoven sliver 100 is composed of synthetic stapled fibers having various deniers, colors and translucencies.

Figure 2:
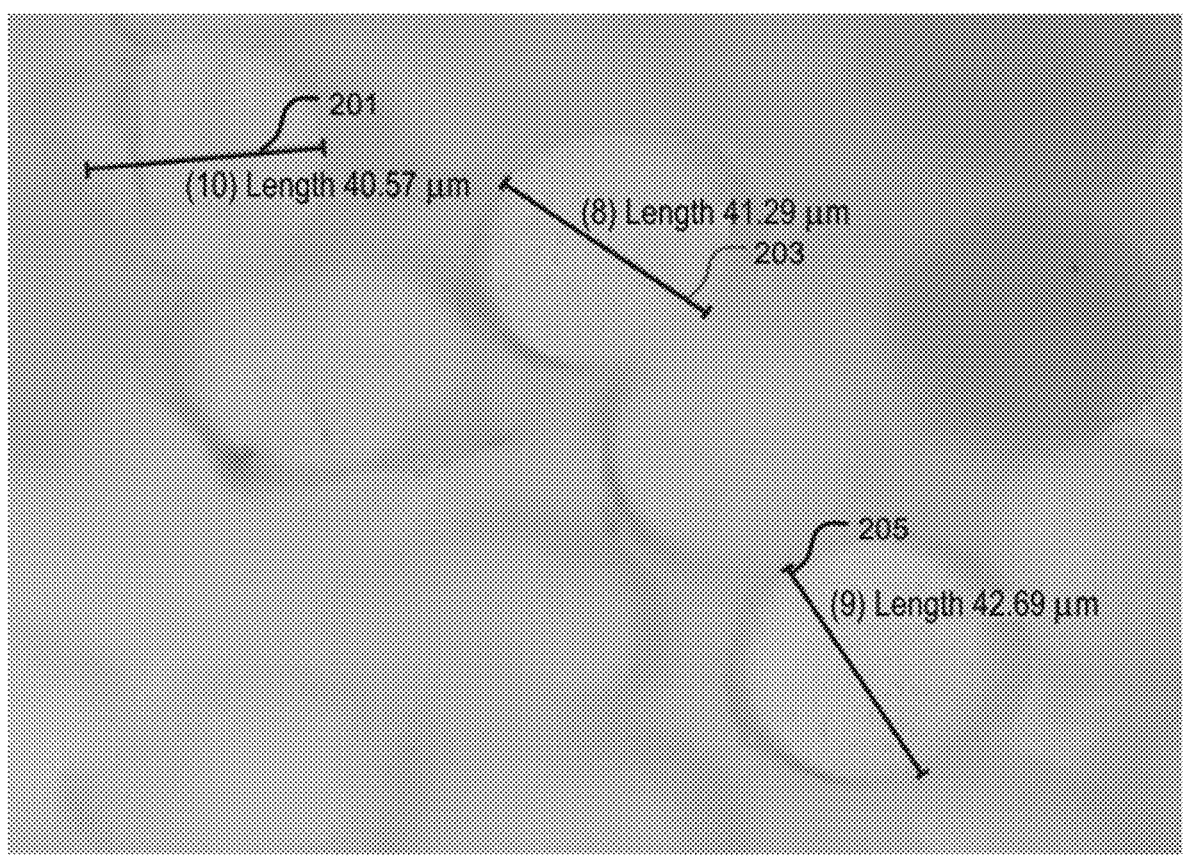
FIG. 2 is a cross-sectional view of another embodiment of a nonwoven sliver with various aspects described herein.

FIG. 2 is a cross-sectional view of another embodiment of a nonwoven sliver 200 with various aspects described herein. FIG. 2 shows that the nonwoven sliver 200 is composed of synthetic stapled fibers having various diameters 201, 203 and 205. For example, one of the synthetic stapled fibers has a diameter 203 of 41.29 micrometers (41.29 μm).

Figure 3:
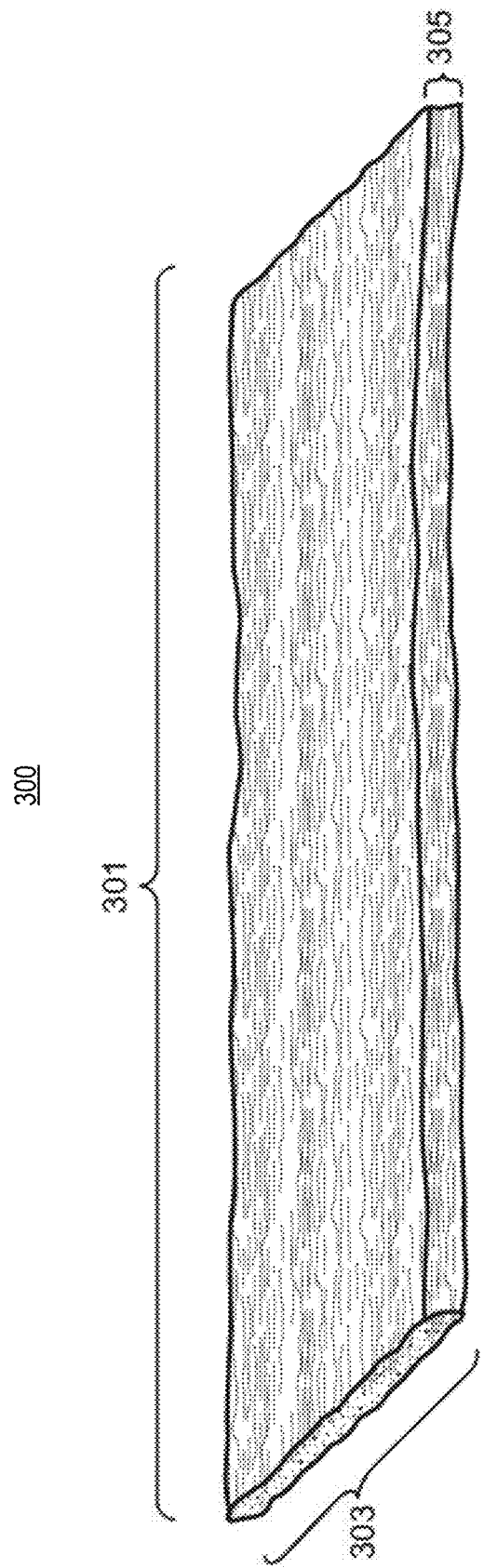
FIG. 3 is a perspective view of one embodiment of a nonwoven sliver with various aspects described herein.

FIG. 3 is a perspective view of one embodiment of a nonwoven sliver 300 with various aspects described herein. In FIG. 3, the nonwoven sliver 300 may be represented by dimensions of length 301, width 303, and thickness 305. In one example, the nonwoven sliver 300 may have a length 301 in a range from about two inches to about twenty-four inches. In another example, the nonwoven sliver 300 may have a width 303 in a range from about one inch to about six inches. In another example, the nonwoven sliver 300 may have a thickness 305 in a range from about 1/64 of an inch to about ½ of an inch.

Figure 4:
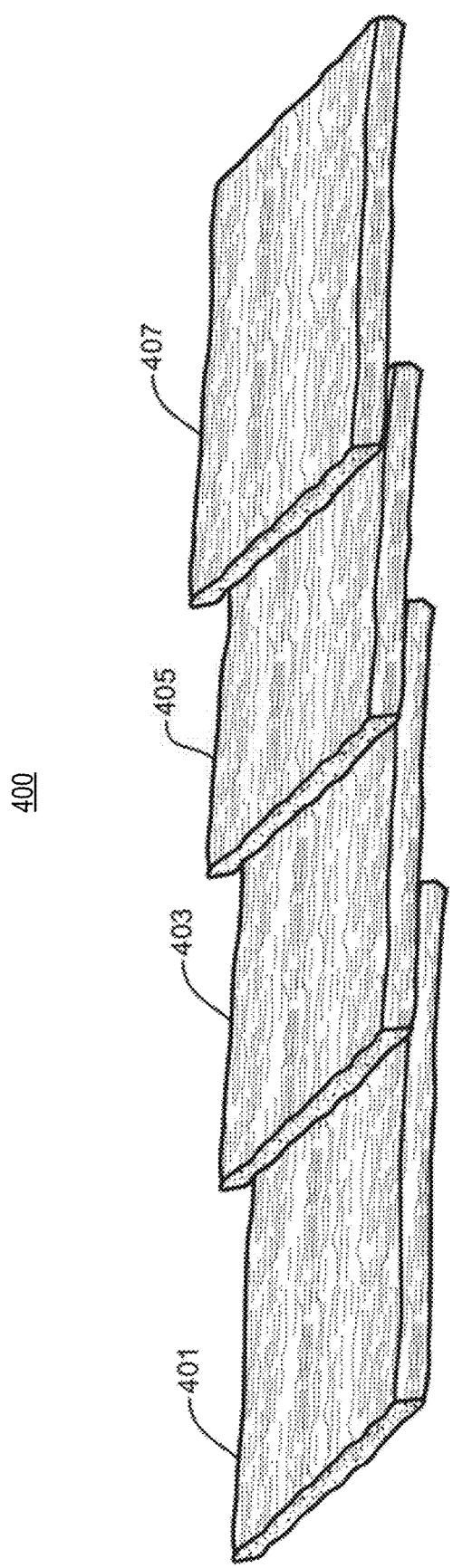
FIG. 4 is a perspective view of one embodiment of combined material with various aspects described herein.

FIG. 4 is a perspective view of one embodiment of combined material 400 with various aspects described herein. In FIG. 4, the combined material 400 may be formed by partially overlaying a plurality of nonwoven slivers 401, 403, 405 and 407. Each of the plurality of nonwoven slivers 401, 403, 405 and 407 may be composed of synthetic staple fibers having various deniers or densities. Further, each of the synthetic staple fibers may be a polymeric or non-polymeric thermoplastic fiber. Also, each of the plurality of nonwoven slivers may be of various dimensions. In one example, each of the plurality of nonwoven slivers 401, 403, 405 and 407 has a different length. In another example, each of the plurality of nonwoven slivers 401, 403, 405 and 407 has a different thickness. In another example, each of the plurality of nonwoven slivers 401, 403, 405 and 407 has a different denier.

Figure 5:
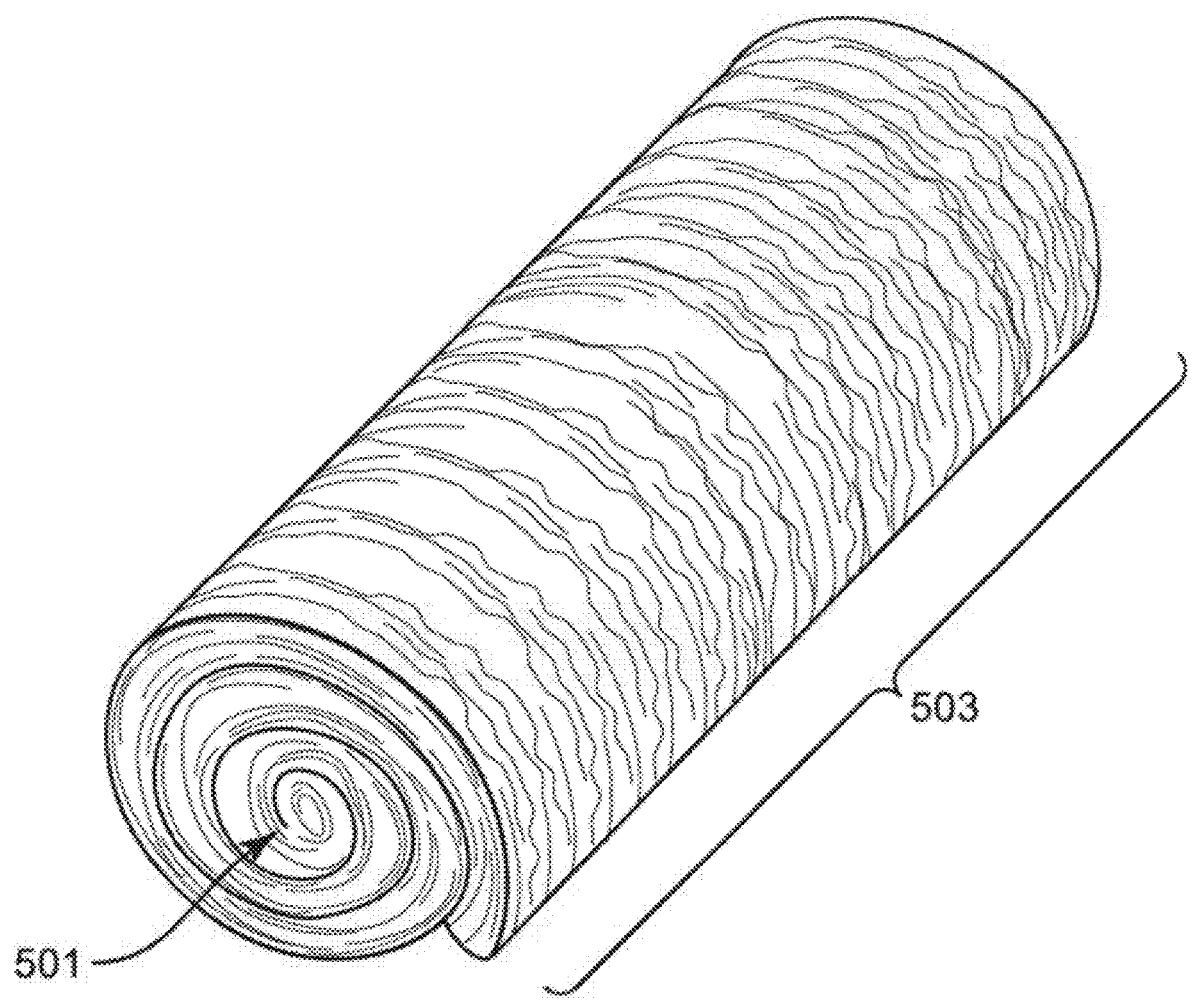
FIG. 5 is a perspective view of one embodiment of a filter medium with various aspects described herein.

FIG. 5 is a perspective view of one embodiment of a filter medium 500 with various aspects described herein. In FIG. 5, the filter medium 500 may have a width 503 in a range from about two inches to about six inches. A single nonwoven sliver or a combined material having a plurality of nonwoven slivers may be formed into a predetermined shape such as a cylinder or a sphere to obtain the filter medium 500. A core 501 of the filter medium 500 is a portion of the filter medium 500 that is disposed near a longitudinal center axis of the filter medium 500.

Figure 6:
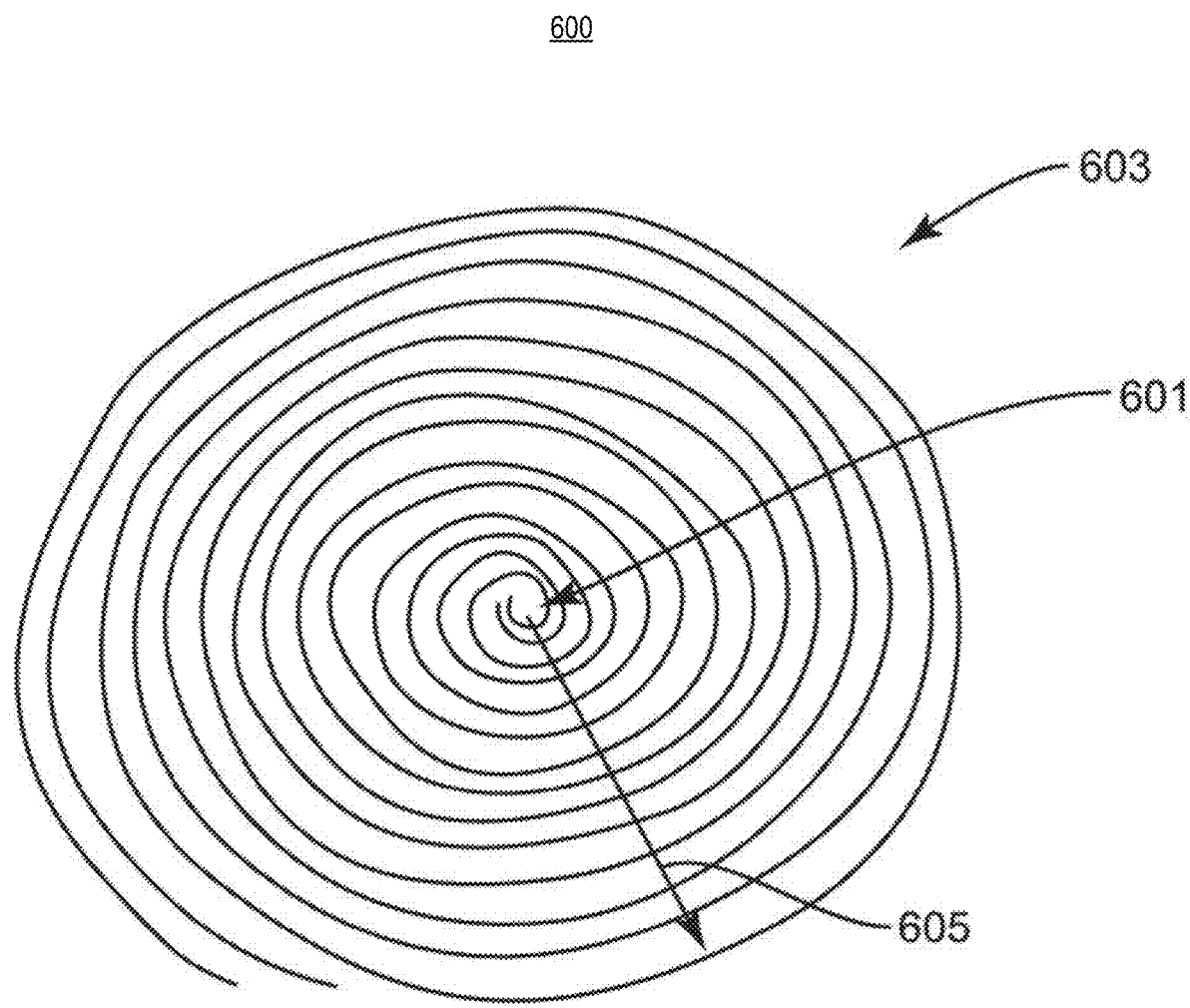
FIG. 6 is a side view of another embodiment of a filter medium with various aspects described herein.

FIG. 6 is a side view of another embodiment of a filter medium 600 with various aspects described herein. In FIG. 6, a core 601 of the filter medium 600 may have a variable density or a variable thickness. Further, a density gradient 605 is defined from the core 601 of the filter medium 500 to an outer surface or side 603 of the filter medium 600.

In another embodiment, a filter medium may be formed by fully overlaying a plurality of nonwoven slivers. For such structure, a density gradient may be about uniform from a core of the filter medium to a surface of the filter medium.

In another embodiment, a filter medium may be formed by partially overlaying a plurality of nonwoven slivers. For such structure, a density gradient may vary from a core of the filter medium to a surface of the filter medium dependent on the density of each of the plurality of nonwoven slivers. For example, a core of a filter medium having a first density and an outer wrap of the filter medium having a second density would result in a density gradient varying from the first density to the second density.

Figure 7:
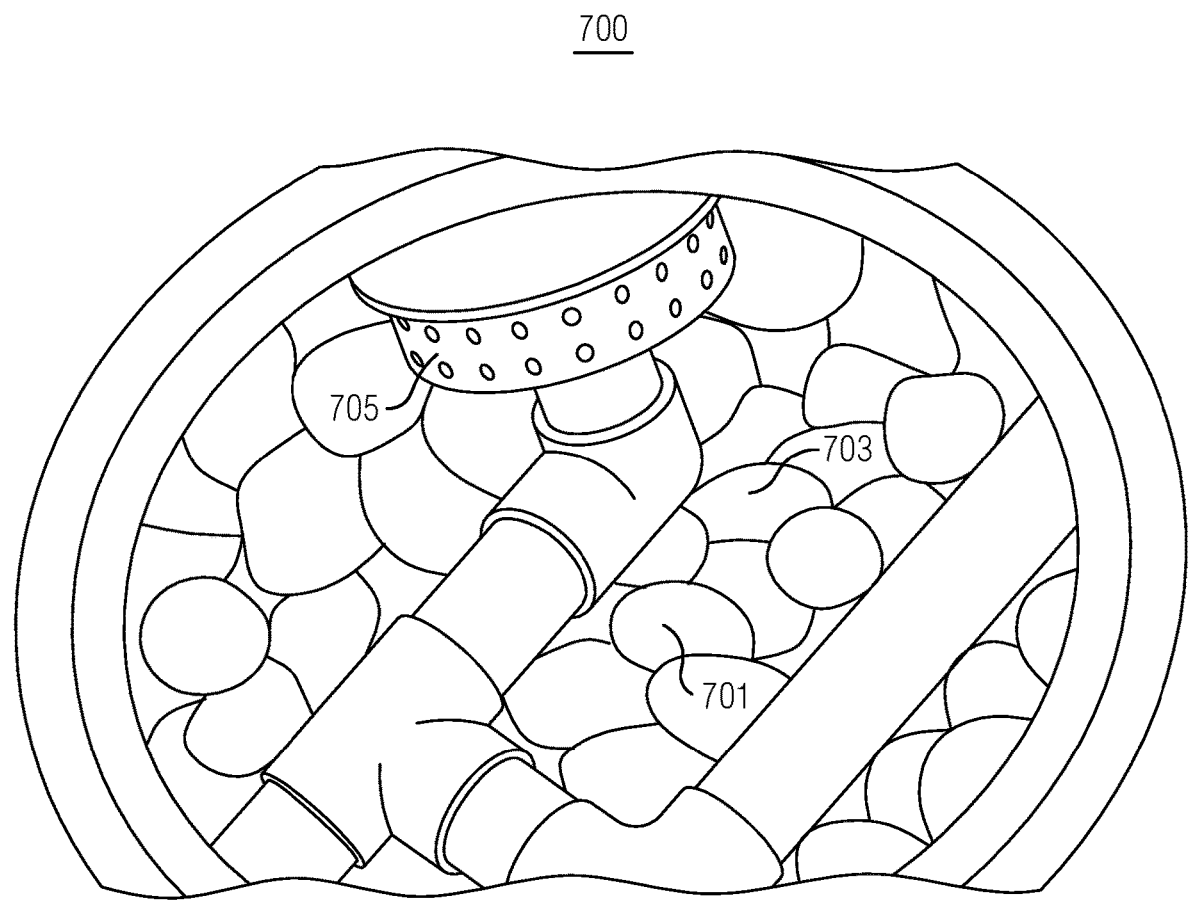
FIG. 7 shows a top view of one embodiment of a filter system having filter media with various aspects described herein.

FIG. 7 shows a top view of one embodiment of a filter system 700 having filter media with various aspects described herein. In FIG. 7, the filter system 700 includes an inlet port (not shown), an outlet port 705 and a plurality of filter media 701, 702 and 703. The outlet 705 may be positioned near a top of the filter system 700 and may output a fluid having particulate matter. The plurality of filter media 701, 702 and 703 may then filter the particulate matter from the fluid to obtain a filtered fluid. In one example, the plurality of filter media 701, 702 and 703 may be contiguous within the filter 700 system. The inlet port may be positioned near a bottom of the filter system 700 and may output the filtered fluid.

Figure 8:
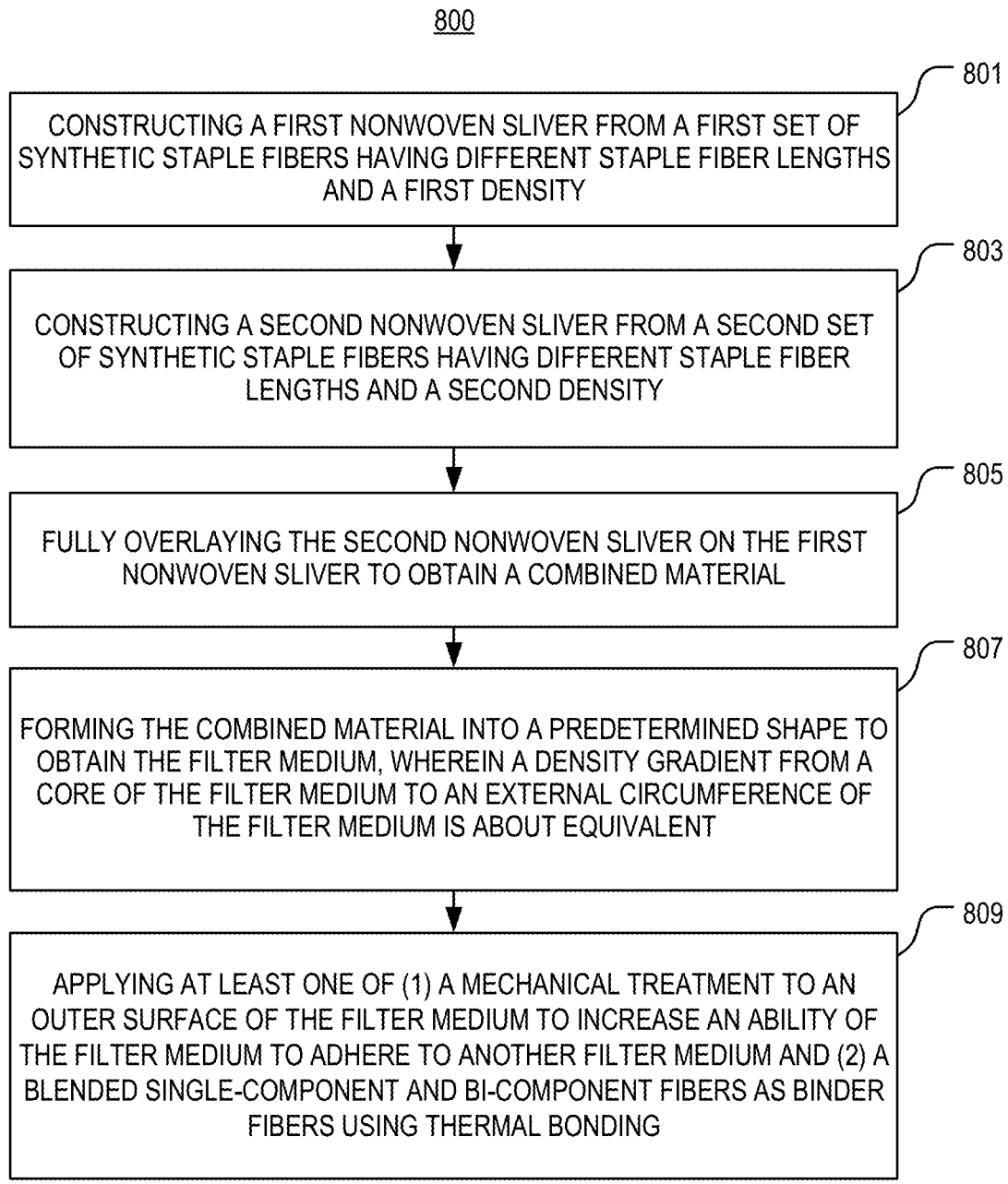
FIG. 8 is one embodiment of a method of producing a filter medium for filtering particulate matter from a fluid with various aspects described herein.

FIG. 8 is one embodiment of a method 800 of producing a filter medium for filtering particulate matter from a fluid with various aspects described herein. In FIG. 8, the method 800 may start, for instance, at block 801 where the method 800 may include constructing a first nonwoven sliver from a first set of synthetic staple fibers having different staple fiber lengths and a first density. At block 803, the method 800 may include constructing a second nonwoven sliver from a second set of synthetic staple fibers having different staple fiber lengths and a second density. At block 805, the method 800 may include fully overlaying the second nonwoven sliver on the first nonwoven sliver to obtain a combined material. At block 807, the method 800 may include forming the combined material into a predetermined shape to obtain the filter medium, wherein a density gradient from a core of the filter medium to an external circumference of the filter medium is about equivalent. At block 809, the method 800 may include applying a mechanical treatment to an outer surface of the filter medium or to blended single-component or bi-component fibers as binder fibers for thermal bonding to increase an ability of the filter medium to adhere to another filter medium.

Figure 9:
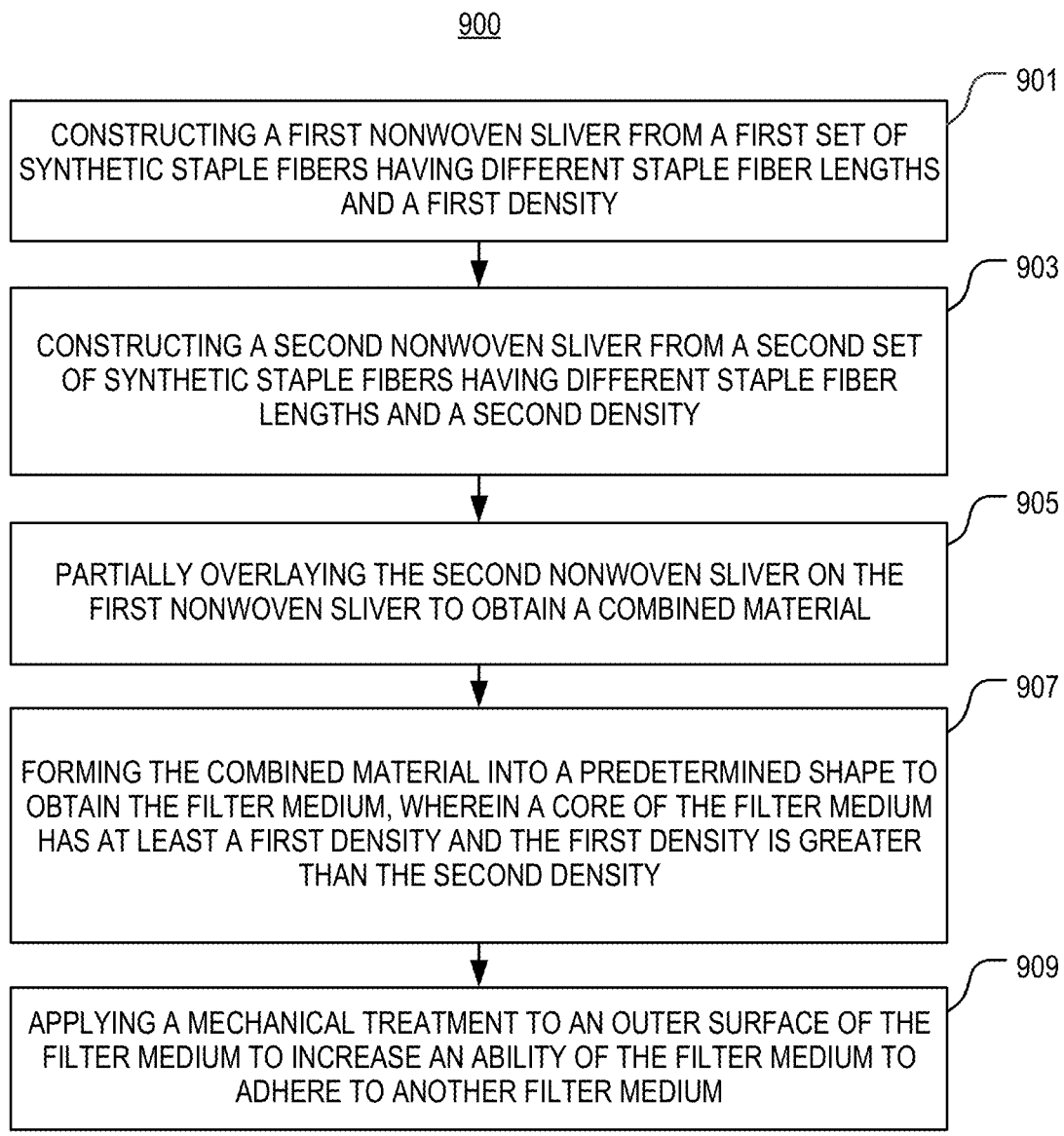
FIG. 9 is another embodiment of a method of producing a filter medium for filtering particulate matter from a fluid with various aspects described herein.

FIG. 9 is another embodiment of a method 900 of producing a filter medium for filtering particulate matter from a fluid with various aspects described herein. In FIG. 9, the method 900 may start, for instance, at block 901 where the method 900 may include constructing a first nonwoven sliver from a first set of synthetic staple fibers having different staple fiber lengths and a first density. At block 903, the method 900 may include constructing a second nonwoven sliver from a second set of synthetic staple fibers having different staple fiber lengths and a second density. At block 905, the method 900 may include partially overlaying the second nonwoven sliver on the first nonwoven sliver to obtain a combined material. At block 907, the method 900 may include forming the combined material into a predetermined shape to obtain the filter medium. Further, a core of the filter medium may have at least a first density. Also, the first density may be greater than the second density. At block 909, the method 900 may include applying a mechanical treatment to an outer surface of the filter medium to increase an ability of the filter medium to adhere to another filter medium.

Figure 10:
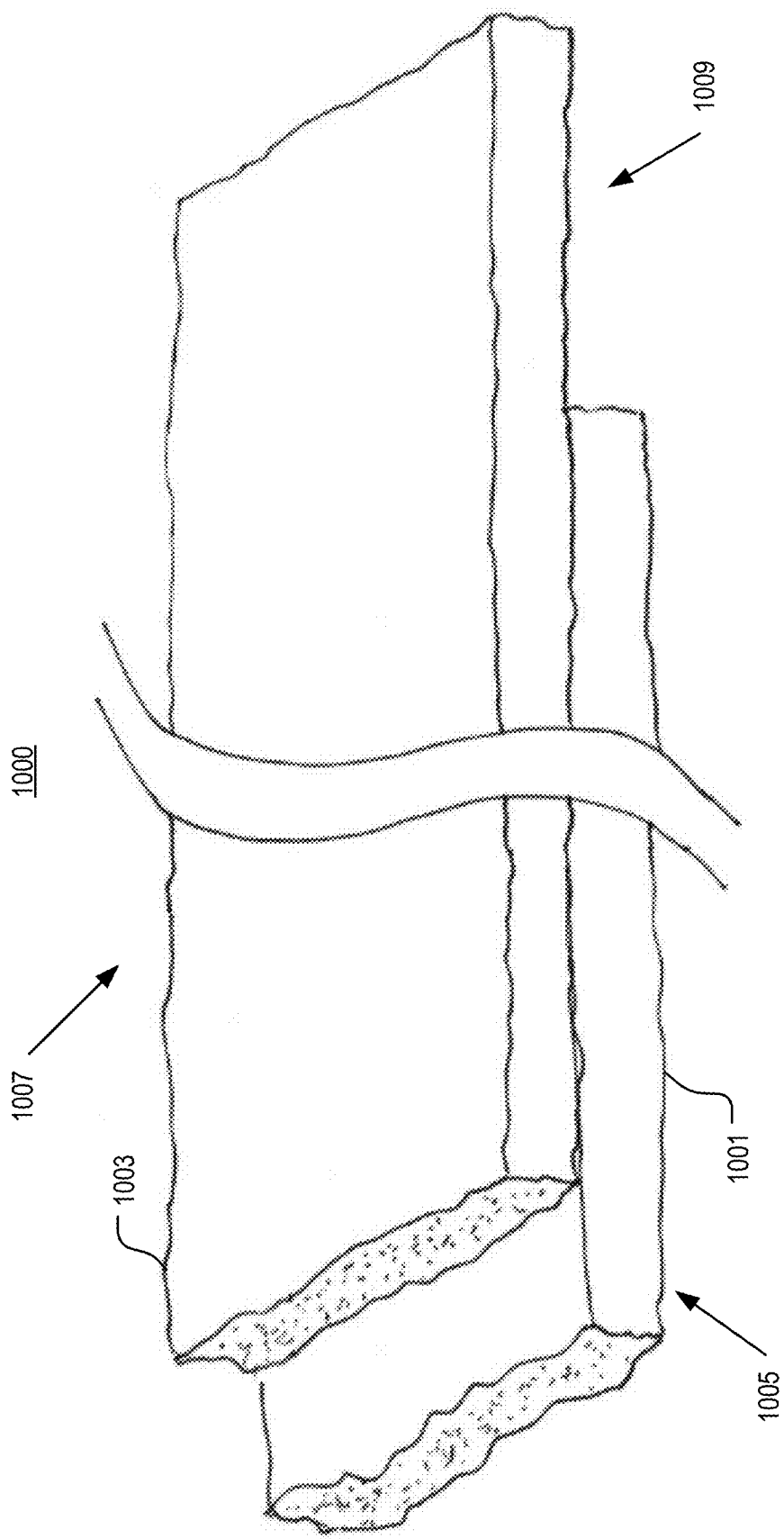
FIG. 10 is a perspective view of another embodiment of combined material with various aspects described herein.

FIG. 10 is a perspective view of another embodiment of combined material 1000 with various aspects described herein. In FIG. 10, the combined material 1000 may be configured to include a first nonwoven sliver 1001 and a second nonwoven sliver 1003. The second nonwoven sliver 1003 may be partially overlaid on the first nonwoven sliver 1001 to form a first non-overlaid portion 1005 associated with the first nonwoven sliver 1001, an overlaid portion 1007 associated with the first and second nonwoven slivers 1001 and 1003, and a second non-overlaid portion 1009 associated with the second nonwoven sliver 1003. The combined material 1000 may be formed into a filter medium having a predetermined shape with the first non-overlaid portion 1005 forming an inner wrap disposed at a core of the filter medium and the second non-overlaid portion 1009 forming an outer wrap disposed at an outer surface or a side surface of the filter medium. Further, the overlaid portion 1007 may be disposed between the core of the filter medium and the outer wrap of the filter medium.

Figure 11:
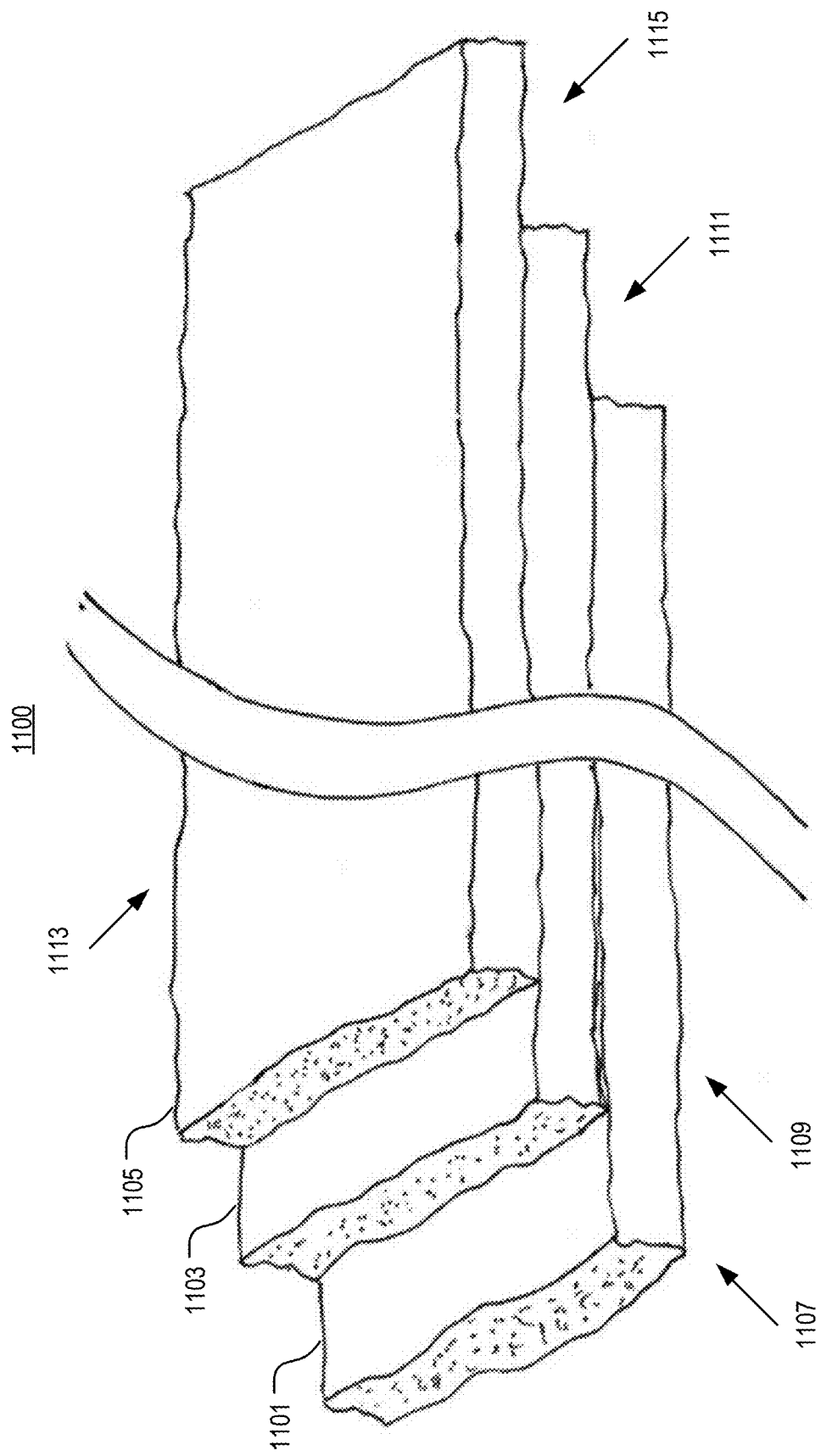
FIG. 11 is a perspective view of another embodiment of combined material with various aspects described herein.

FIG. 11 is a perspective view of another embodiment of combined material 1100 with various aspects described herein. In FIG. 11, the combined material 1100 may be configured to include a first nonwoven sliver 1101, a second nonwoven sliver 1103, and a third nonwoven sliver 1105. The second nonwoven sliver 1103 may be partially overlaid on the first nonwoven sliver 1101 to form a first non-overlaid portion 1107 associated with the first nonwoven sliver and a first overlaid portion 1109 associated with the first nonwoven sliver 1101 and the second nonwoven sliver 1103. The third nonwoven sliver 1105 may be overlaid on the first and second nonwoven slivers 1101 and 1103 to form a second overlaid portion 1111 associated with the second and third nonwoven slivers 1103 and 1105, a third overlaid portion 1113 associated with the first, second and third nonwoven slivers 1101, 1103 and 1105 and a second non-overlaid portion 1115 associated with the third nonwoven sliver 1105. The combined material 1100 may be formed into a filter medium having a predetermined shape with the first non-overlaid portion 1107 forming a first inner wrap disposed at a core of the filter medium, the first overlaid portion 1109 forming a second inner wrap disposed near the core of the filter medium, the second non-overlaid portion 1115 forming a first outer wrap disposed at an outer surface or side surface of the filter medium, and the second overlaid portion 1111 forming a second outer wrap disposed near the outer surface or side surface of the filter medium. Further, the third overlaid portion 1113 may be disposed between the second inner wrap of the filter medium and the second outer wrap of the filter medium.

Figure 12:
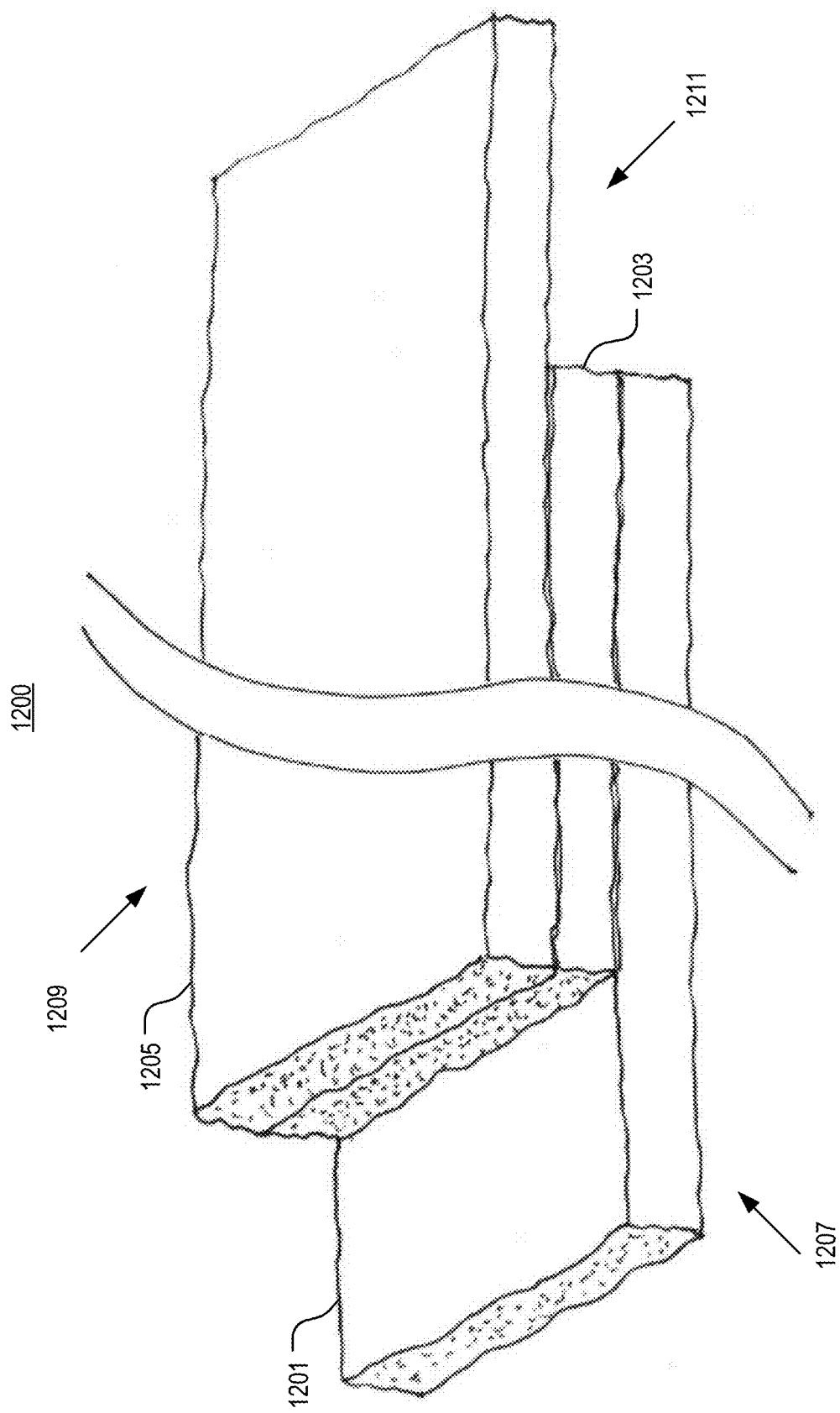
FIG. 12 is a perspective view of another embodiment of combined material with various aspects described herein.

FIG. 12 is a perspective view of another embodiment of combined material 1200 with various aspects described herein. In FIG. 12, the combined material 1200 may be configured to include a first nonwoven sliver 1201, a second nonwoven sliver 1203, and a third nonwoven sliver 1205. The second nonwoven sliver 1203 may be partially overlaid on the first nonwoven sliver 1201 to form a first non-overlaid portion 1207 associated with the first nonwoven sliver 1201. The third nonwoven sliver 1205 may be partially overlaid on the first and second nonwoven slivers 1201 and 1203 to form an overlaid portion 1209 associated with the first, second and third nonwoven slivers 1201, 1203 and 1205, and a second non-overlaid portion 1211 associated with the third nonwoven sliver 1205. The combined material 1200 may be formed into a filter medium having a predetermined shape with the first non-overlaid portion 1207 forming an inner wrap disposed at a core of the filter medium and the second non-overlaid portion 1211 forming an outer wrap disposed at a side surface of the filter medium. Further, the overlaid portion 1109 may be disposed between the inner wrap of the filter medium and the outer wrap of the filter medium.

In another embodiment, an outer wrap of the filter medium may have the second density.

In one embodiment, a filter medium may be composed of polymeric and non-polymeric resin-based thermoplastic fibers that are manipulated by extruding or melt blown then carding, sorting and rolling into a predetermined shape such as a cylinder or a sphere and capable of filtering particulate matter from a fluid such as a process liquid, water or gas.

In another embodiment, a filter medium may be composed of polymeric or non-polymeric thermoplastic fibers in various deniers (including micro deniers) and various dimensional profiles. Further, the thermoplastic fibers may be constructed into a sliver and formed into a filter medium having a shape such as a sphere, a cylinder or the like. Also, the filter medium may be combined with another filter medium to form a filter media to filter a fluid.

In another embodiment, a thermoplastic fiber may have a denier in the range of 0.1 denier (0.1 D) to fifty denier (50 D).

In another embodiment, a nonwoven sliver may be constructed from staple fibers that range in length from about two inches to about six inches. The staple fibers may then be crimped and folded to have a cross-locking characteristic. The combination of the length of the fibers and the crimping of the fibers may eliminate shedding of fiber material during use, resulting in reducing or eliminating fiber migration during filtering of a fluid.

In another embodiment, a filter medium may be constructed using one or more nonwoven slivers with each sliver having a different density. Further, each sliver may have fibers having different deniers.

In another embodiment, one or more nonwoven slivers may be initially rolled tighter to form a core of a filter medium that is denser and has a higher concentration of smaller fibers than an outer wrap of the filter medium. This construction may allow for targeting the filter media for specific micron retention capabilities.

In another embodiment, an outer surface area of a filter medium may be prepared during a carding process to achieve a roughness coefficient that may allow a filter medium to bond with another filter medium. The ability for the filter medium to bond with the other filter medium may also be associated with a vibratory nature of an inlet flow and a wetting process, resulting in positioning each filter medium against each other. During a back-flush cycle, a reverse action or separation of each filter medium may be performed using a back-flush pressure and a fluid flow that may release trapped particulate matter from each filter medium and may discharge this particulate matter into a waste drain, resulting in rejuvenating or cleaning each filter medium.

A typical use of a filter media as disclosed herein may be as a replacement media for filter sand and other granular bed media vessels. These types of filters are typically closed systems that use backwashing instead of media replacement to regenerate the filtering capabilities of the filter media. A filter media capable of backwashing generally relies on a high velocity of a fluid through the filter media to regenerate the filtering capabilities of the filter media. The filter media as disclosed herein allows for the filtration or removal of fine particulate matter to a low level.

In one embodiment, a filter medium for filtering particulate matter from a fluid may be configured to include a nonwoven sliver having a certain density and may be formed into a predetermined shape for filtering particulate matter from the fluid. Further, the nonwoven sliver may be composed of first synthetic staple fibers having a first staple fiber length and a first denier, and second synthetic staple fibers having a second staple fiber length and a second denier. Also, a portion of the first synthetic staple fibers may be crimped with a portion of the second synthetic staple fibers.

In another embodiment, a filter medium for filtering particulate matter from a fluid may be configured to include a first nonwoven sliver composed of a first set of synthetic staple fibers having different staple fiber lengths and a first density, and a second nonwoven sliver composed of a second set of synthetic staple fibers having different staple fiber lengths and a second density. Further, the first nonwoven sliver and the second nonwoven sliver may be combined to form a predetermined shape having a core with a density of at least the first density. Also, the first density may be greater than the second density.

In another embodiment, the second nonwoven sliver may be partially overlaid on the first nonwoven sliver and combined to form the predetermined shape so that the first nonwoven sliver may be substantially disposed in a core of the predetermined shape.

In another embodiment, the first density may be in a range from about 0.01 g/cm3 to about 0.2 g/cm3.

In another embodiment, the second density may be in a range from about 0.01 g/cm3 to about 0.2 g/cm3.

In another embodiment, the first set of synthetic staple fibers may be composed of first synthetic staple fibers having a first staple fiber length and second synthetic staple fibers having a second staple fiber length. In one example, a first set of synthetic staple fibers may be composed of a first synthetic staple fiber having a first staple fiber length of about eighteen inches (18") and may be used to form a filter medium having a predetermined shape of a ball. In another example, a first set of synthetic fibers may be composed of a first synthetic staple fiber having a first staple fiber length of about two inches (2") and a second synthetic staple fiber having a second staple fiber length of about ten inches (10"). Further, a second set of synthetic fibers may be composed of a third synthetic staple fiber having a third staple fiber length of about six inches (6") and a fourth synthetic staple fiber having a staple fiber length of about eight inches (8"). Also, the first set of synthetic staple fibers and the second set of synthetic staple fibers may compose a first nonwoven sliver, which may be used to form a predetermined shape such as a ball.

In another embodiment, the first staple fiber length may be in a range from about two inches (2") to about twenty-four inches (24"), and the second staple fiber length may be in a range from about two inches (2") to about twenty-four inches (24").

In another embodiment, the first set of synthetic staple fibers may be composed of first synthetic staple fibers having a first denier, and second synthetic staple fibers having a second denier.

In another embodiment, the first denier may be in a range from about one denier (1 D) to about one hundred denier (100 D), and the second denier may be in a range from about one denier (1 D) to about one hundred denier (100 D). In one example, first synthetic staple fibers having a first staple fiber length of determined size may have about thirty-five percent (35%) of about six denier (6 D) and about fifteen percent (15%) of about seventeen denier (17 D). In another example, first synthetic staple fibers having a first staple fiber length of determined size may have about forty percent (40%) of about two denier (2 D) and about twenty percent (20%) of about eight denier (8 D). In another example, first synthetic staple fibers having a first staple fiber length of determined size may have about forty percent (40%) of about two denier (2 D). In another example, second synthetic staple fibers having a second staple fiber length of determined size may have about twenty percent (20%) of about eight denier (8 D) and about twenty percent (20%) of about seventeen denier (17 D). In another example, third synthetic staple fibers having a third staple fiber length of determined size may have about thirty percent (30%) of about twelve denier (12 D) and about thirty percent (30%) of about twenty-five denier (25 D). In another example, fourth synthetic staple fibers having a fourth staple length of determined size may include about twenty percent (20%) of about twenty denier (20 D) and about fifteen percent (15%) of about one hundred denier (100 D).

In another embodiment, the first set of synthetic staple fibers may be composed of first synthetic staple fibers having a first average diameter, and second synthetic staple fibers having a second average diameter.

In another embodiment, the first average diameter may be in a range from about three microns (3 μm) to about three hundred microns (300 μm), and the second average diameter may be in a range from about three microns (3 μm) to about five hundred microns (500 μm).

In another embodiment, a portion of the first synthetic staple fibers may be crimped with a portion of the second synthetic staple fibers.

In another embodiment, the second set of synthetic staple fibers may be composed of third synthetic staple fibers having a third staple fiber length, and fourth synthetic staple fibers having a fourth staple fiber length.

In another embodiment, the third staple fiber length may be in a range from about two inches (2") to about twenty-four inches (24"), and the fourth staple fiber length may be in a range from about two inches (2") to about twenty-four inches (24").

In another embodiment, the second set of synthetic staple fibers may be composed of third synthetic staple fibers having a third denier, and fourth synthetic staple fibers having a fourth denier.

In another embodiment, the third denier may be in a range from about one denier (1 D) to about one hundred denier (100 D), and the fourth denier may be in a range from about one denier (1 D) to about one hundred denier (100 D).

In another embodiment, the second set of synthetic staple fibers may be composed of third synthetic staple of fibers having a third average diameter, and fourth synthetic staple of fibers having a fourth average diameter.

In another embodiment, the third average diameter may be in a range from about three microns (3 μm) to about five hundred microns (500 μm), and the fourth average diameter may be in a range from about three microns (3 μm) to about five hundred microns (500 μm).

In another embodiment, a portion of the third synthetic staple of fibers may be crimped with a portion of the fourth synthetic staple fibers.

In another embodiment, the predetermined shape may be a cylinder.

In another embodiment, the predetermined shape may be a sphere.

In another embodiment, an average staple fiber length of the first nonwoven sliver may be less than an average staple fiber length of the second nonwoven sliver.

In another embodiment, the different staple fiber lengths of the first nonwoven sliver may be in a range from about two inches to about six inches.

In another embodiment, the different staple fiber lengths of the second or additional nonwoven sliver(s) may be in a range from about two inches to about six inches.

In another embodiment, a percentage of the first set of synthetic staple fibers in a total volume of the filter medium may be less than about two percent.

In another embodiment, a percentage of the second set of synthetic staple fibers in a total volume of the filter medium may be less than about two percent.

In another embodiment, a percentage of the first set of synthetic staple fibers and the second set of synthetic staple fibers in a total volume of the filter medium may be less than about two percent.

In another embodiment, a percentage of the first set of synthetic staple fibers and the second set of synthetic staple fibers in a total volume of the filter medium may be in a range from about one percent to about two percent.

In another embodiment, the filter medium may have a flow resistance in a range from about one millibar (1 mb) to about fifty millibars (50 mb).

In another embodiment, the filter medium may have a flow resistance in a range from about one millibar (1 mb) to about five hundred millibars (500 mb).

In another embodiment, the filter medium may have a flow resistance in a range from about one millibar (1 mb) to about five millibars (5 mb).

In another embodiment, the filter medium may have a first-pass filtration rate of at least about 99%.

In another embodiment, the synthetic staple fibers may be composed of thermoplastic fibers.

In another embodiment, the thermoplastic fibers may be at least one of polymeric thermoplastic fibers and non-polymeric thermoplastic fibers.

In one embodiment, a method of producing a filter medium for filtering particulate matter from a fluid may include constructing a first nonwoven sliver from a first set of synthetic staple fibers having different staple fiber lengths and a first density. Further, the method may include constructing a second nonwoven sliver from a second set of synthetic staple fibers having different staple fiber lengths and a second density. Also, the method may include overlaying the second nonwoven sliver on the first nonwoven sliver to obtain a combined material. The method may include forming the combined material into a predetermined shape to obtain the filter medium. The filter medium may have a core with substantially the first density. In addition, the first density may be greater than the second density.

In another embodiment, the method may include rolling the combined material into the predetermined shape.

In another embodiment, the method may include overlaying the second nonwoven sliver on a portion of the first nonwoven sliver to form a non-overlaid portion and an overlaid portion of the combined material.

In another embodiment, the method may include rolling the non-overlaid portion of the combined material and then rolling the overlaid portion of the combined material.

In another embodiment, the method may include rolling the non-overlaid portion of the combined material tighter than rolling the overlaid portion of the combined material.

In another embodiment, the method may include overlaying the second nonwoven sliver on a portion of the first nonwoven sliver to form a first non-overlaid portion associated with the first nonwoven sliver, an overlaid portion and a second non-overlaid portion associated with the second nonwoven sliver of the combined material.

In another embodiment, the method may include rolling the second non-overlaid portion of the combined material.

In another embodiment, the method may include rolling the second non-overlaid portion of the combined material after rolling the first non-overlaid portion and the overlaid portion of the combined material.

In another embodiment, the method may include applying a mechanical treatment to an outer surface of the filter medium to increase an ability of the filter medium to adhere to another filter medium.

In another embodiment, the method may include applying at least one of (1) a mechanical treatment to an outer surface of the filter medium to increase an ability of the filter medium to adhere to another filter medium and (2) a blended single-component and bi-component fibers as binder fibers using thermal bonding.

In another embodiment, the method may include applying a blended single-component and bi-component fibers as binder fibers using thermal bonding.

In another embodiment, the filter medium is capable of filtering the particulate matter with a grain size in a range from one micron to five microns.

In another embodiment, the filter medium is capable of filtering the particulate matter with a grain size in a range from one micron to one thousand microns.

In one embodiment, a filter for filtering a fluid may be configured to include a housing, a fluid inlet coupled to the housing, a fluid outlet coupled to the housing, and a filter media. The filter media may be composed of a plurality of filter mediums disposed in the housing and used to filter the fluid from the fluid inlet and output the filtered fluid to the fluid outlet. Each of the plurality of filter mediums may be configured to include a first nonwoven sliver composed of a first set of synthetic staple fibers having different staple fiber lengths and a first density, and a second nonwoven sliver composed of a second set of synthetic staple fibers having different staple fiber lengths and a second density. Further, the first nonwoven sliver and the second nonwoven sliver may be combined to form a predetermined shape having a core with at least the first density. Also, the first density may be greater than the second density.

In another embodiment, a method of producing a filter medium for filtering particulate matter from a fluid may include constructing a first nonwoven sliver from a first set of oleophillic or hydrophobic synthetic staple fibers having different staple fiber lengths and a first density. Further, the method may include constructing a second nonwoven sliver from a second set of oleophobic or hydrophillic synthetic staple fibers having different staple fiber lengths and a second density. Also, the method may include overlaying the second nonwoven sliver on the first nonwoven sliver to obtain a combined material. In addition, the method may include forming the combined material into a predetermined shape to obtain the filter medium. The filter medium may have a core with substantially the first density. In addition, the first density may be greater than the second density.

In another embodiment, a set of staple fibers may be composed of:
  about ten percent (10%) to about sixty percent (60%) of about six denier (6 D) synthetic fibers;
  about ten percent (10%) to about sixty percent (60%) of about seventeen denier (17 D) synthetic fibers; and
  about ten percent (10%) to about percent (40%) of about twenty-five denier (25 D) to about thirty denier (30 D) synthetic fibers.

In another embodiment, a set of staple fibers may be composed of:
  about ten percent (10%) to about sixty percent (60%) of about three denier (3 D) synthetic fibers;
  about ten percent (10%) to about sixty percent (60%) of about twenty denier (20 D) synthetic fibers; and about ten percent (10%) to about forty percent (40%) of about twenty-five denier (25 D) to about forty denier (40 D) synthetic fibers.

In another embodiment, a set of staple fibers may be composed of:
about ten percent (10%) to about sixty percent (60%) of about two denier (2 D) synthetic fibers;
about ten percent (10%) to about sixty percent (60%) of about twenty denier (20 D) synthetic fibers; and
about ten percent (10%) to about forty percent (40%) of about twenty-five denier (25 D) to about forty denier (40 D) synthetic fibers.

In another embodiment, a set of staple fibers may be composed of:
about ten percent (10%) to about sixty percent (60%) of about two denier (2 D) to about six denier (6 D) synthetic fibers;
about ten percent (10%) to about sixty percent (60%) of ten denier (10 D) to seventeen denier (17 D) synthetic fibers;
about ten percent (10%) to about sixty percent (60%) of about twenty denier (20 D) synthetic fibers; and
about ten percent (10%) to about sixty percent (60%) of about twenty-five denier (25 D) to about forty denier (40 D) synthetic fibers.

In another embodiment, a set of staple fibers may be composed of:
about ten percent (10%) to about sixty percent (60%) of about one denier (1 D) to about ten denier (10D) synthetic fibers;
about ten percent (10%) to about sixty percent (60%) of ten denier (10 D) to twenty denier (20D) synthetic fibers;
about ten percent (10%) to about sixty percent (60%) of about twenty denier (20 D) to about twenty-five denier (25 D) synthetic fibers; and
about ten percent (10%) to about sixty percent (60%) of about twenty-five denier (25 D) to about forty denier (40 D) synthetic fibers.

In another embodiment, a synthetic fiber may be a thermoplastic synthetic fiber.

In another embodiment, a synthetic staple fiber may range from about two inches (2") to about six inches (6") in length.

In another embodiment, a synthetic staple fiber may be crimped.

In another embodiment, a sliver may be formed into a predetermined shape having a core of a first density and an outer wrap of a second density.

In another embodiment, a sliver may include a set of staple fibers.

In another embodiment, a sliver may include synthetic fibers of variable denier.

In another embodiment, a sliver may include Cobalt 58, Cobalt 60 or Cesium isotope reduction enhancements impregnated or embedded within the synthetic fibers of the sliver.

In another embodiment, a synthetic staple fiber may be oleophillic.

In another embodiment, a synthetic staple fiber may be hydrophobic.

In another embodiment, a filter medium may be composed of one sliver.

In another embodiment, a filter medium may be composed of a plurality of slivers.

FIG. 13 is another embodiment of a method 1300 of filtering particulate matter from a fluid using a filter medium with various aspects described herein. In FIG. 13, the method 1300 may include filtering, by a filter medium, the particulate matter from the fluid. Further, the filter medium may include a nonwoven sliver formed into a predetermined shape and composed of first synthetic staple fibers having a first denier, second synthetic staple fibers having a second denier, and third synthetic staple fibers having a third denier. In one example, the first synthetic staple fibers may have the first denier of about six (6) denier, the second synthetic staple fibers may have the second denier of about seventeen (17) denier, and the third synthetic staple fibers may have the third denier of about forty-five (45) denier. Also, the filter medium may have a shape of a cylinder.

Figure 15:
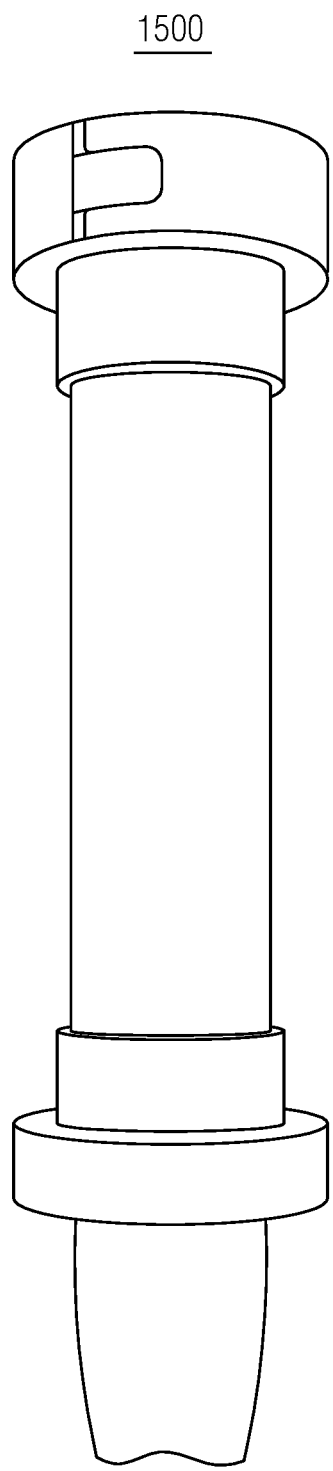
FIG. 15 illustrates a housing used to contain filter media for measuring fiber migration.

FIG. 14 is a table 1400 describing fiber migration measurements of one embodiment of a filter medium 1401 as described herein compared to fiber migration measurements of commercially available filter media. The filter medium 1401 is configured to include a nonwoven sliver formed into a cylindrical shape and composed of first synthetic staple fibers having a first denier of about six (6) denier, second synthetic staple fibers having a second denier of about seventeen (17) denier, and third synthetic staple fibers having a third denier of about forty-five (45) denier. The fiber migration measurements were made per the SAE J905 (2009) modified test standard. The modifications to the SAE J905 (2009) test standard included using water as the test fluid, performing a microscope analysis for fibers only, and using single media test per analysis disk. The test conditions during the fiber migration measurements included applying a flow rate of fifteen gallons per minute per square foot (15 gpm/ft2 or 633 cc/min) to the filter media for a total flush volume of eighteen thousand nine-hundred and ninety milliliters (18,990 ml). The flush time was thirty (30) minutes. Further, six (6) filter media 1401 (i.e., filter balls) as described herein were positioned in series (i.e., one above another) in a conical bottom of a housing 1500 having 1.43" inner diameter (ID), as illustrated in FIG. 15. Also, a filter analysis disc was mounted at the housing exit. The instrument used to count the number of fibers that migrated through the filter media was an Olympus BX-40 Episcopic Microscope having 10× ocular magnification, 10× objective magnification and 100× total magnification. Only fibers with dimensions of at least 100 µm×10 µm were counted.

In FIG. 14, the six (6) filter media 1401 as described herein was measured to have a fiber migration of seventy-one (71) fibers. The commercially-available filter media tested were the Fibalon® Pool media 1403 and the polyBalls media 1405. The Fibalon® Pool media 1403 was measured to have a fiber migration of one thousand, three hundred and eight-two (1,382) fibers. The polyBalls media 1405 was measured to have a fiber migration of one thousand, four hundred and twenty-two (1,422) fibers. Hence, the filter media 1401 has substantially less fiber migration than commercially-available filter media.

A new system for high efficiency liquid filtration using fiber media is also disclosed herein. This system provides the following advantages:
  ease of use for installing parties: System will come pre-loaded with filter media to match pool filtration needs;
  components are pre-qualified and matched to achieve maximum performance for the target pool;
  meets or exceeds energy efficiency requirements as set forth in the 2020 Department of Energy (DOE) proposed standards;
  meets or exceeds the turn-over rate for safe pool water as set forth by the Center of Disease Control (CDC) standards Chapter 14;

improved Lateral design contained within the back-wash housing to maximize flow and improve filtration;

can be installed with controller circuit to permit high energy consuming operation on off-peak energy cost times;

the only system that takes advantage of smaller pumps (e.g., below ¾ horse power (HP)) and still meets the CDC recommended turnover rates of three to four times per day;

the only system that takes advantage of high efficiency two-speed pumps (e.g., low-speed operation of the pump for filter mode and high-speed operation of the pump for backwash) and meet the CDC recommended turnover rates of three to four times per day;

the only system that takes advantage of high-efficiency variable speed pumps (e.g., permitting dedicated filter modes at lower speed operation of the pump and providing higher speed pump operation for backwash, while meeting or exceeding the CDC recommended turnover rates of three to four times per day;

advanced deep bed dirt holding capacity allows for less frequent back-wash cycles; and improved flow allows less chemical use and less vacuuming due to improved circulation.

Pool owners face several chronic problems associated with maintaining the water quality of a commercial or residential pool. First, poor water quality may be the result of ineffective filtration or chemical treatment of the pool water. Second, the power required to operate the filtration equipment, such as high-energy consuming pumps and inefficient filter media, may result in expensive energy bills. Third, the filtration equipment (e.g., pumps, filter, filter media, and the like) may be expensive. For example, traditional filter media options such as sand does not allow for the effective use of power efficient multiple-speed pumps. Finally, the regular maintenance required to maintain the water quality of a commercial or residential pool may be expensive such as from intensive weekly service, high-pressure filter systems that decrease the life of seals, bearings, pump motors and the like, sand that bypasses into the piping system that may cause valves to break, seals to leak, or that may even return to the pool, and labor-intensive pool opening and winterizing.

Above ground pools installed by do-it-yourself methods are often fraught with problems. First, an above ground pool may have a poor filtration configuration such as by using pumps that higher power rating than required for that pool. Further, the filter housing may not be large enough to provide sufficient flow for filtering the pool water of that pool. Second, an above ground pool may have a filtration configuration that lacks good installation guidance and filtration media selection. Third, the maintenance of an above ground pool may reflect bad water chemistry management. For instance, such management may provide too much or too little chemical application or an improper chemical application of the pool water. Fourth, the poor water quality of above ground pools may be the result of poor equipment configurations or design.

Furthermore, many do-it-yourself pool owners select and purchase pool filtration components without obtaining professional guidance. Indeed, such owners may purchase their components over the Internet. The Department of Energy completed an extensive research study on the pool industry and, among other things, determined that most pool equipment manufacturers sell pool components with consumers arbitrarily selecting these components. In some cases, pool equipment manufacturers offer filter and pump combinations. However, no pool equipment manufacturer currently offers a complete pool filtration system having a pump, piping, and pre-loaded back-washable filter housing with filter media disposed therein.

The Department of Energy has passed regulations governing sand and cartridge filtration. These regulations include energy conservation standards for dedicated pool pumps, as represented by 10 C.F.R. § 431. For instance, these regulations set standards mandating the use of dedicated, single speed, two speed, and variable speed pumps. These regulations were developed using exhaustive research completed with pump manufacturers with a focus on sand and cartridge filter media housings and pump combinations. However, characteristics of the filter media type and filter housing back pressure are not described in the regulations.

The CDC has also provided guidance associated with the pool content turnover rate. The CDC defines the pool content turnover rate as the number of times a pool's contents can be filtered through its filtration equipment in a twenty-four hour period is the turnover rate of the pool. Because the filtered water is diluted with the non-filtered pool water, the turbidity continually decreases. Once the pool water has reached equilibrium with the sources of contamination, a six hour turnover rate will result in ninety-eight percent (98%) clarification if the pool is properly designed. A typical-use pool should have a pump and filtration system capable of pumping the entire contents of the pool though the filters every six hours. However, many pool filtration systems do not have the capability to turnover a pool four or more times per day.

This disclosure further provides a pool filtration system using the filter media disclosed herein that meet these Department of Energy and CDC requirements for commercial and residential pools. Further, this disclosed system also provides the following advantages over traditional filter media:

higher efficiency pool filtration operation that has a lower energy consumption than the same pool filtration system but having an equivalent volume of sand or cartridge-based filter media;

lower head pressure of the filter housing having the filter media disclosed herein than that of the same filter housing but having an equivalent volume of sand or cartridge-based filter media;

increased flow rate (e.g., improved turnover) through the filtration system than that of the same filtration system but having an equivalent volume of sand or cartridge-based filter media;

increased utilization of the filter media disclosed herein than that of a sand or cartridge-based filter media;

meets and/or exceeds National Science Foundation (NSF) and American National Standards Institute (ANSI) standards for lead-free pools, potable water, and downstream fiber migration;

provides different filtration levels down to one micron nominal;

offers flexibility for hydrophobic/oleophilic or hydrophilic/oleophobic applications and removal;

use and re-use of traditional sand filter media-based housing; and reduced maintenance with less frequent backwashing, easy winterization, and easy recyclable, disposal and replacement compared to the same system but having an equivalent volume of sand or cartridge-based filter media.

Furthermore, the use of power efficient pumps requires less power to pump pool water through the filter media disclosed herein than the traditional sand filter media, cartridge filter media or diatomaceous earth (DE) filter media. As such, the new system of pool filtration as described herein allows for the filter media, pump, filter housing, and piping collectively to be configured based on the volume of water needed for the pool and safety requirements such as those previously described by the CDC and DoE.

The pool industry recognizes three main categories of water filtration methods. First, sand filters require a filter housing designed to contain mineral based media such as sand, glass, zeolite, and the like. Further, sand filters typically have backwash valves and laterals designed with small perforations to block sand particles from escaping the filter housing. Second, a cartridge filter uses a pleated cylindrical filter media that is typically replaceable. Third, a DE filter typically provides the finest granularity filtration using mined and refined silica and has backwash valves with replenishing media after each backwash cycle.

In addition, the filter media disclosed herein provides better filtration system performance than that of the same system but having an equivalent volume of sand or cartridge filter media. For instance, traditional loose bed filtration media (e.g., sand, zeolite, ruby sand, glass, and the like) is heavy and causes significant flow resistance, resulting in increased head pressure and reduced flow through the filtration system. This media being typically heavy and cumbersome is expensive to transport and difficult, time-consuming to install in a filter housing and dispose thereof. Also, FIG. 16 is a table comparing characteristics of the filter media disclosed herein with that of other filter media.

By replacing traditional filter media in a filter housing with the filter media disclosed herein, the components of the filtration system can be designed and configured to improve the energy efficiency of the filtration system. These improvements may include:

reducing a volume of the filter housing;
reducing a volume of the filter media used in the filter housing;
using a lower-power filter pump;
reducing the speed of by a variable speed or multi-speed pump;
adding a controller circuit to a filter pump that adjusts the speed of the pump dependent on the measured flow rate through the filtration system by a flow meter; and
adding a controller circuit to a filter housing that manages the filtration and backwashing cycles of the filter housing based on the measured flow rate through the filtration system by a flow meter.

For instance, FIGS. 17 and 18 are tables comparing the energy consumption of a pool filtration system using the filter media disclosed herein and the same pool filtration system using an equivalent volume of sand for respective large and nominal pools.

The components of the filtration system disclosed herein includes one or more of the following:

filter media such as that disclosed herein;
high-efficiency pump designed to meet contemplated DOE performance requirements;
variable speed, two speed, or single speed pumps;
filter housing having a cavity with sufficient volume to optimize the fluid flow for a certain pool size;
multiport valve coupled to the inlet and outlet ports of the filter housing for filtering the fluid via the filter media when the multiport valve is in a first configuration, backwashing the filter media when the multiport valve is in a second configuration, and cleaning the filter media when the multiport valve is in a third configuration;
outlet port of filter housing having a larger slot (e.g., cross-sectional area) to provide for improved flow through the filter media;
increased size of piping between components so as to increase fluid flow through the filtration system;
a first controller circuit of a pump, the first controller circuit being operable to adjust the speed of the pump dependent on the measured flow rate through the filtration system by a flow meter; and
a second controller circuit of a filter housing, the second controller circuit being operable to manage the filtration, backwashing and cleaning cycles of the filter based on the flow rate through the filtration system measured by a flow meter.

Figure 19A:
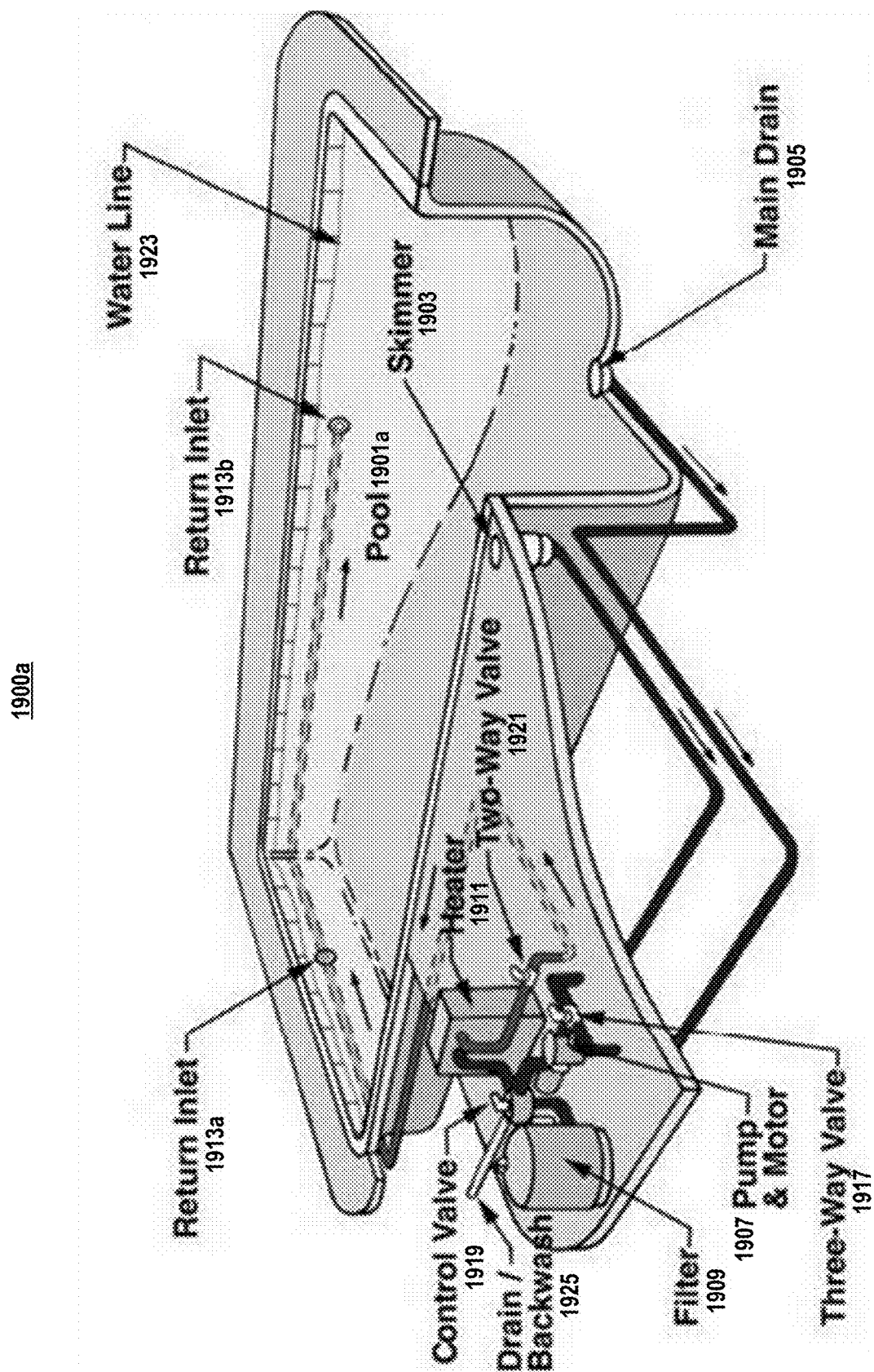
FIG. 19A illustrates one embodiment of an in-ground pool filtration system in accordance with various aspects as described herein.

FIG. 19A illustrates one embodiment of an in-ground pool filtration system 1900a in accordance with various aspects as described herein. In FIG. 19A, the system 1900a includes a pool 1901a, a pump 1907, a filter 1909, a heater 1911, the like, or any combination thereof. Further, the pool 1901 includes a skimmer 1903, a main drain 1905, one or more return inlets 1913a,b, or the like. The pump 1907 is configured to move liquid (e.g., water, salt water, or the like) through the system 1900. The pump 1907 may be a single speed, variable speed or multiple speed pump. The filter 1909 includes a housing having inlet and outlet ports with filter media 1929 disposed in the housing between the inlet and outlet ports. Further, the filter 1909 is configured to filter particulate matter from the liquid via filter media 1929. In one example, the filter media 1929 may be a compressible filter media with synthetic fibers such as that described herein. Further, a pressure difference between inlet and outlet ports of the filter 1909 having the filter media 1929 is less than four pounds per square inch differential (4 psid). Also, the pump 1907 is operationally coupled to the filter 1909 and is operable to move the liquid through the filter media 1929 with a flux rate of at least eighteen gallons per minute per square foot (18 GPM/ft2) of the filter media 1929 while operating at less than one electrical horsepower (1 HP). In another example, the filter 1909 has a cartridge-based filter media disposed therein. Further, a pressure difference between the input and output ports of the filter 1909 is less than seven pounds per square inch differential (7 psid). Also, the pump is operationally coupled to the filter 1909 and is operable to move the liquid through the filter media 1929 with a flux rate of at least two gallons per minute per square foot (2 GPM/ft$^2$) of the filter media 1929 while operating at less than one electrical horsepower (1 HP).

In operation, the system 1900 is configured to pull liquid from the pool 1901 through the skimmer 1903 and the main drain 1905, move the liquid via the pump 1907 through the filter 1909 (and optionally through the heater 1911), and then push the filtered liquid back into the pool 1901 through the return inlets 1913a,b. Further, the system 1900 may include a three-way valve 1917 disposed between the pump 1907, and the skimmer 1903 and the main drain 1905. The three-way valve 1917 may be configured to combine the liquid flows received from the skimmer 1903 and the main drain 1905 and output a single liquid flow towards the inlet port of the pump 1907. The system 1900 may also include a control valve 1919 that is coupled to the inlet and outlet ports of the filter 1909. The control valve 1919 may be configured to be manually or automatically placed in a first configuration for filtering liquid via the filter media, a second configuration for backwashing the filter media via a drain 1925, and a third configuration for cleaning the filter media via the drain 1925. In addition, the system 1900 may include a two-way valve 1921 disposed between the filter 1909 and the return inlets 1913*a,b* that is configured to divide a single liquid flow into two flows, with each divided flow output towards a corresponding return inlet 1913*a,b*.

In FIG. 19A, the skimmer 1903 may be a bucket, built into the side of the pool 1901 and may house a skimmer basket. It is via the skimmer 1903 that water is extracted from the pool 1901 and through the system 1900. The skimmer 1903 may have a small basket disposed therein to catch any debris including leaves, sticks, bugs and the like floating on the surface of the pool 1901. Further, the water line 1923 of the pool 1901 typically must be above a bottom portion of an entry from the pool to the skimmer for the water to enter the skimmer 1903. This entry to the skimmer is another location where liquid from the pool is pulled in and pushed through your filter. The pool liquid may also be extracted via the main drain 1905, which is typically located at the deepest portion of the pool 1901. While the skimmer 1903 pulls liquid from the surface of the pool 1901, the main drain 1905 pulls liquid from the bottom of the pool 1901. The liquid filtered by the filter 1909 is pushed back into the pool 1901 using the return inlets 1913*a,b*. Further, the return inlets 1913*a,b* may push or circulate the liquid around the pool 1901 such as to allow the skimmer 1903 to collect debris from the surface of the pool 1901.

Figure 19B:
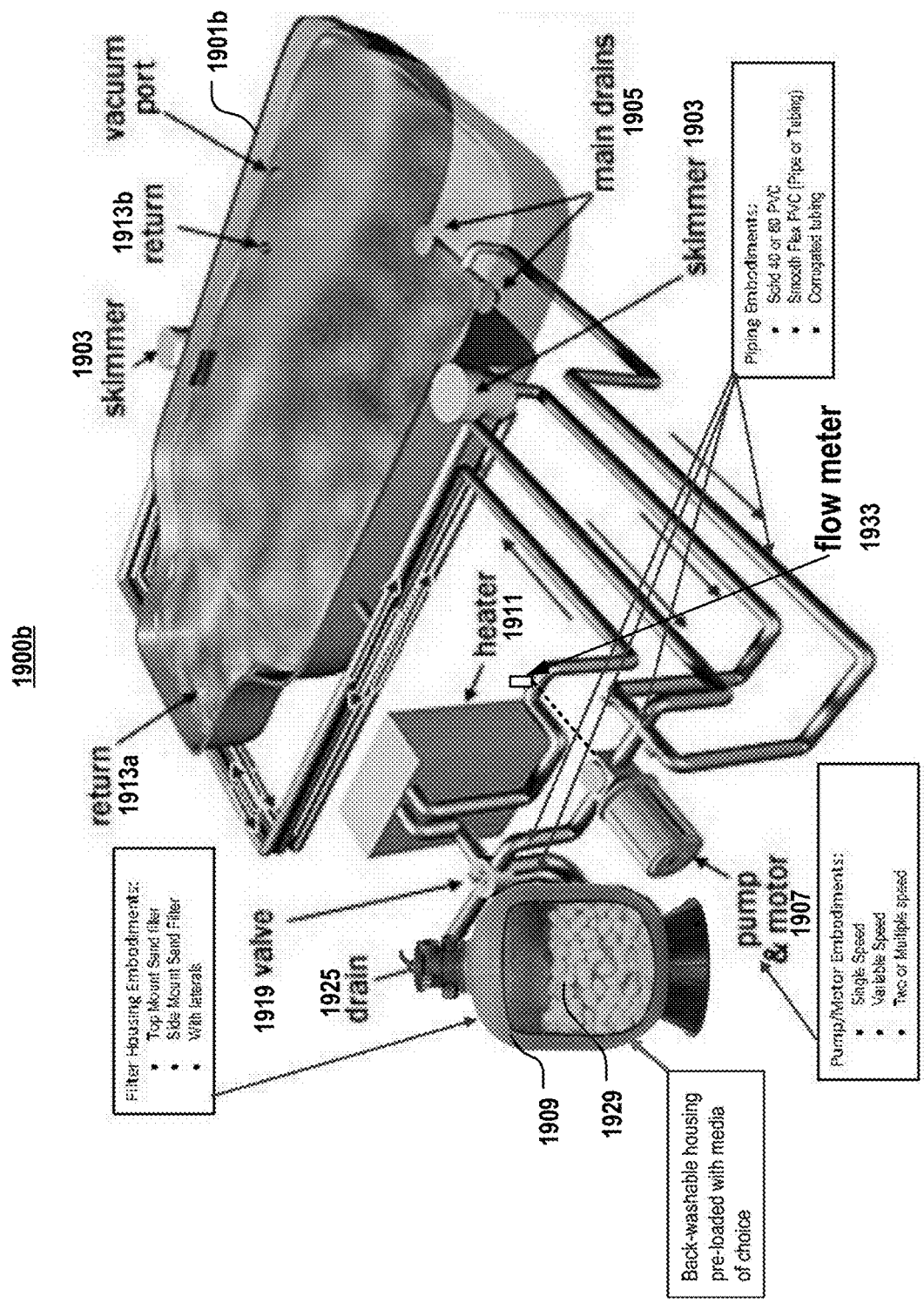
FIG. 19B illustrates another embodiment of an in-ground pool filtration system in accordance with various aspects as described herein.
Figure 19C:
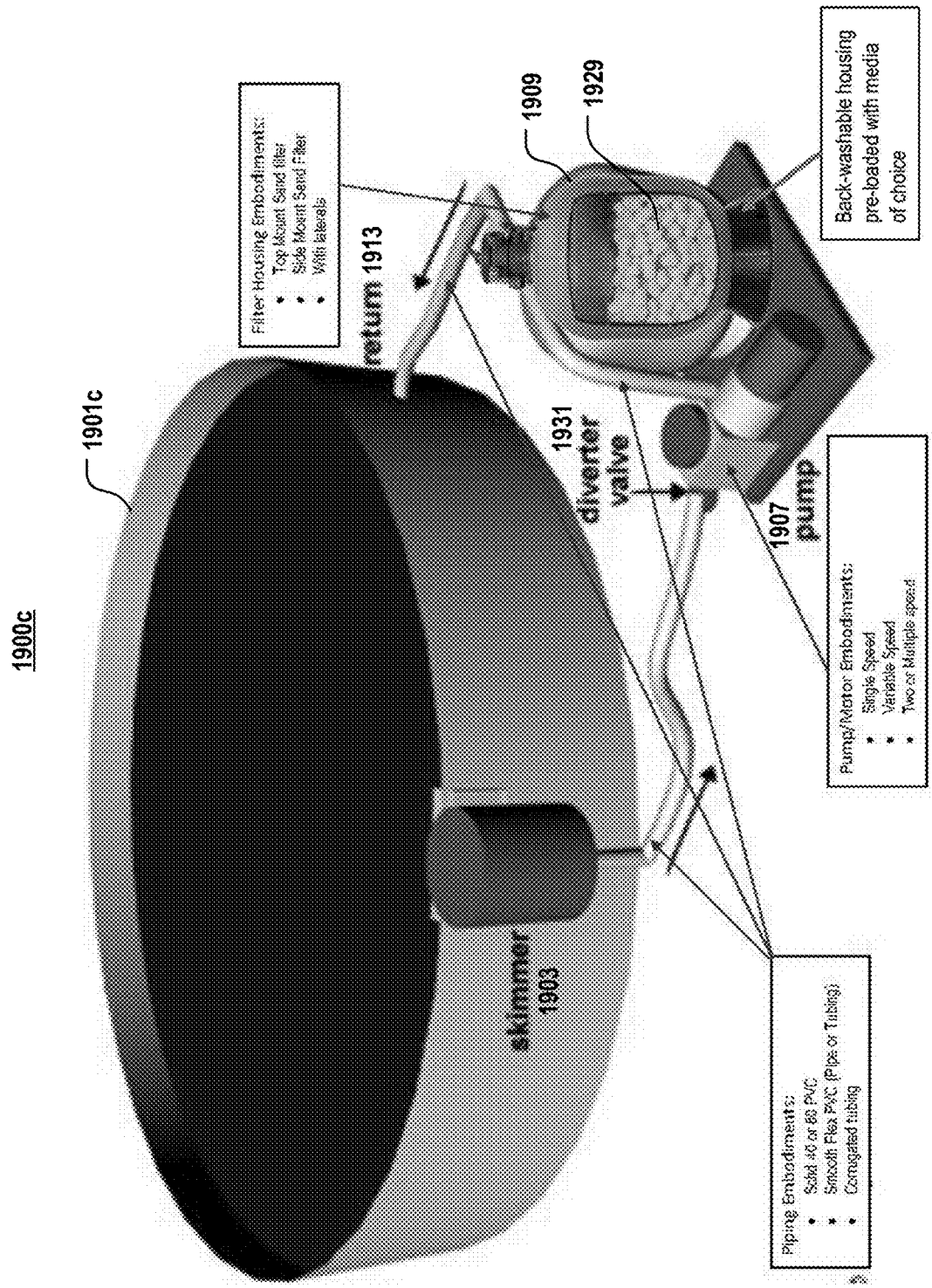
FIG. 19C illustrates one embodiment of an above-ground pool filtration system in accordance with various aspects as described herein.

FIG. 19B illustrates another embodiment of an in-ground pool filtration system 1900*b* in accordance with various aspects as described herein. FIG. 19C illustrates one embodiment of an above-ground pool filtration system 1900*c* in accordance with various aspects as described herein.

In another embodiment, the pump 1907 is a single speed pump that is configured to operate at less than one horsepower (1 HP) to move liquid through the filter media 1929 of the filter 1909 with a flux rate of at least eighteen gallons per minute per square foot (18 GPM/ft$^2$) of the filter media 1929.

In another embodiment, the pump 1907 is a multiple speed pump with a first fixed speed having lower revolutions per second (associated with an impeller of the pump 1907) than a second fixed speed. The pump 1907 is configured to operate at the first fixed speed when the filter 1909 is configured to filter the liquid by the filter media 1929 and at the second fixed speed when the filter 1909 is configured to backwash or clean the filter media 1929 using the liquid. Further, when the pump 1907 is operating at the first fixed speed, the pump 1907 operates at less than one horsepower (1 HP) to move liquid through the filter media 1929 of the filter 1909 with a flux rate of at least eighteen gallons per minute per square foot (18 GPM/ft$^2$) of the filter media 1929.

In yet another embodiment, the pump 1907 is a variable speed pump with a first variable speed having lower revolutions per second (associated with an impeller of the pump 1907) than a second variable speed. The pump 1907 is configured to operate at the first variable speed when the filter 1909 is configured to filter fluid by the filter media and at the second variable speed when the filter 1909 is configured to backwash or clean the filter media 1929. Further, when the pump 1907 is operating at the first variable speed, the pump 1907 operates at less than one horsepower (1 HP) to move liquid through the filter media 1929 of the filter 1909 with a flux rate of at least eighteen gallons per minute per square foot (18 GPM/ft$^2$) of the filter media.

In one embodiment, the system 1900*a-c* may include a flow meter 1933 that is configured to measure the flow of liquid through the system 1900*b*. As shown in FIG. 19B, the flow meter 1933 is disposed on the piping between the heater 1911 and the returns 1900*a,b*. However, the flow meter 1933 may be disposed at other locations in the system 1900*b*, including on the piping between the pump 1907 and the filter 1909, on the piping between the filter 1909 and the heater 1911, on other piping of the system 1900*a-c*, integrated with the pump 1907, the filter 1909 or other components of the system 1900*a-c*, or the like. A measurement by the flow meter 1933 may be used to directly or indirectly control the speed of the pump 1907. In one configuration, the flow meter 1933 is operationally coupled to a controller circuit of the pump 1907. The controller circuit is configured to receive, from the flow meter 1933, an indication of a flow rate measurement. In response, the controller circuit is configured to adjust the speed of the pump 1907 based on the flow rate measurement so as to, for instance, maintain a certain minimum flux rate through the filter media of the filter 1909, maintain a certain flow rate through the system 1900*a-c*, or the like.

While FIGS. 19A-C refer to pools, the same techniques can also be applied to other volumes of liquid including aquariums, fountains, ponds, streams, moving body of liquid, rivers, lakes, inland water bodies, or the like.

In one embodiment, a system for filtering particulate matter from a liquid comprises a filter having a housing with inlet and outlet ports. Further, compressible filter media having synthetic fibers is disposed in the housing between the inlet and outlet ports and is operable to filter particulate matter from the liquid. The pressure difference between the inlet and outlet ports with the filter media disposed in the housing is less than four pounds per square inch differential (4 psid). The system also includes a pump operationally coupled to the filter and operable to move the liquid through the filter media of the filter with a flux rate of at least eighteen gallons per minute per square foot (18 GPM/ft$^2$) of the filter media while operating at less than one electrical horsepower (1 HPE).

In another embodiment, the pump is operable to move the liquid through the filter media with a flux rate of at least five gallons per minute per square foot (5 GPM/ft$^2$) of the filter media while the pump is operating at no more than 0.711 hydraulic HP.

In another embodiment, the pump is operable to move the liquid through the filter media with a flux rate of at least eighteen gallons per minute per square foot (18 GPM/ft$^2$) of the filter media while the pump is operating at no more than 0.711 hydraulic HP.

In another embodiment, the pump is operable to move the liquid through the filter media with a flux rate of at least twenty gallons per minute per square foot (20 GPM/ft$^2$) of the filter media while the pump is operating at 0.5 electrical HP.

In another embodiment, the pump is operable to move the liquid through the filter media of the filter with a flux rate in a range of eighteen to thirty gallons per minute per square foot (18 to 30 GPM/ft$^2$) of the filter media while the pump is operating at less than one electrical HP.

In another embodiment, a pressure difference between inlet and outlet ports with the filter media disposed in the housing is less than two pounds per square inch differential (2 psid).

In another embodiment, the filter media includes a plurality of filter mediums, with each filter medium being a nonwoven sliver formed into a predetermined shape. Further, the nonwoven sliver is composed of first synthetic staple fibers having a first denier, second synthetic staple fibers having a second denier, and third synthetic staple fibers having a third denier. Further, each filter medium is capable of filtering the particulate matter from the liquid.

In another embodiment, at least one of the first, second and third synthetic staple fibers has a different length.

In another embodiment, the filter media is capable of fiber migration of no more than about one hundred fibers for a flush volume of about 18,990 milliliters applied to the filter medium having a volume of about 0.053 cubic feet.

In another embodiment, the filter media is capable of fiber migration of no more than five hundred fibers for a flush volume of about 18,990 milliliters applied to the filter media having a volume of about 0.053 cubic feet.

In another embodiment, the first denier is in a range from about one denier to about ten denier, the second denier is in a range from about ten denier to about twenty denier and the third denier is in a range from about twenty denier to about fifty denier.

In another embodiment, the second denier is in a range from about ten denier to about twenty denier. Further, the first denier is less than the second denier and the third denier is more than the second denier.

In another embodiment, a density of a core of the filter medium is greater than a density of an outer wrap of the filter medium.

In another embodiment, a composition of the nonwoven sliver includes about 10% to about 60% of the first synthetic staple fibers, about 10% to about 60% of the second synthetic staple fibers and about 10% to about 40% of the third synthetic staple fibers.

In another embodiment, a percentage of a volume of the first, second and third synthetic staple fibers in a volume of the filter medium is less than about 2%.

In another embodiment, the filter media is operable to filter the particulate matter with a grain size of at least five microns.

In another embodiment, each filter medium has a flow resistance of no more than about 50 millibars.

In another embodiment, the pump is operable to move a liquid from a commercial or residential pool through the filter media of the filter.

In another embodiment, the pool is at least 10,000 gallons.

In one embodiment, a system for filtering particulate matter from a liquid comprises a filter having a housing with inlet and outlet ports. Further, compressible filter media having synthetic fibers is disposed in the housing between the inlet and outlet ports and is operable to filter particulate matter from the liquid. The pressure difference between the inlet and outlet ports with the filter media disposed in the housing is less than four pounds per square inch differential (4 psid). The system also includes a pump operationally coupled to the filter and operable to move the liquid through the filter media of the filter with a flux rate of at least five gallons per minute per square foot (5 GPM/ft$^2$) of the filter media while operating at less than one electrical horsepower (1 HPE).

In one embodiment, a method for filtering particulate matter from a liquid comprises filtering, by a filter having compressible filter media with synthetic fibers, particulate matter from a liquid. Further, a pressure difference between inlet and outlet ports with the filter media disposed in a housing of the filter is less than four pounds per square inch differential (4 psid). In addition, the method includes moving, by a pump operationally coupled to the filter, a liquid through the filter media of the filter with a flux rate of at least eighteen gallons per minute per square foot (18 GPM/ft2) of the filter media while operating at less than one electrical horsepower (1 HP).

In one embodiment, a system for filtering particulate matter from a liquid comprises a filter having cartridge-based filter media. The filter media being operable to filter particulate matter from a liquid. Further, a pressure difference between input and output ports of the filter with the filter media disposed in a housing of the filter is less than seven pounds per square inch differential (7 psid). In addition, the system includes a pump operationally coupled to the filter and operable to move a liquid through the filter media of the filter with a flux rate of at least two gallons per minute per square foot (2 GPM/ft$^2$) of the filter media while operating at less than one electrical horsepower (1 HP).

In another embodiment, the pump is operable to move a liquid through the filter media of the filter with a flux rate of at least two gallons per minute per square foot (2 GPM/ft$^2$) of the filter media while operating at no more than 0.711 hydraulic HP.

In another embodiment, a method for filtering particulate matter from a liquid comprises filtering, by a filter having cartridge-based filter media, particulate matter from a liquid, wherein a pressure difference between input and output ports of the filter is less than seven pounds per square inch differential (7 psid). Further, the method includes moving, by a pump operationally coupled to the filter, a liquid through the filter media of the filter with a flux rate of at least two gallons per minute per square foot (2 GPM/ft$^2$) of the filter media while operating at less than one electrical horsepower (1 HP).

In one embodiment, a system for filtering particulate matter from a liquid comprises a filter having a filter housing, inlet and outlet ports and compressible filter media with synthetic fibers, with the filter media being disposed in the housing between the inlet and outlet ports and being operable to filter particulate matter from the liquid, wherein a pressure difference between the inlet and outlet ports with the filter media disposed in the housing is less than four pounds per square inch differential (4 psid) with liquid being moved through the filter media with a flux rate of at least eighteen gallons per minute per square foot (18 GPM/ft2) of the filter media.

In one embodiment, a system for filtering particulate matter from a liquid comprises a pump, operationally coupled to a filter having a housing, inlet and outlet ports, and compressible filter media with synthetic fibers disposed in the housing between the inlet and outlet ports, operable to move the liquid through the filter media with a flux rate of at least eighteen gallons per minute per square foot (18 GPM/ft2) of the filter media while operating at less than one electrical horsepower (1 HPE). Further, a pressure difference between the inlet and outlet ports with the filter media disposed in the housing is less than four pounds per square inch differential (4 psid).

In another embodiment, the maximum accumulated weight of particulate matter that the filter media disclosed herein can collect in the filter media is at least twenty times that of an equivalent volume of sand (e.g., #20 sand) used as the filter media.

In another embodiment, the accumulated weight of particulate matter that the filter media disclosed herein can collect in the filter media at the suggested threshold (e.g., 6 psid) for initiating the backwashing cycle for the filter media is at least twenty times that of an equivalent volume of sand (e.g., #20 sand) used as the filter media.

FIG. 20 is a flowchart of one embodiment of a method 2000 of filtering particulate matter from a fluid in accordance with various aspects as described herein. In FIG. 20, the method 2000 may start, for instance, at block 2001 where it includes filtering, by a filter having a filter housing, inlet and outlet ports and compressible filter media with synthetic fibers, particulate matter from the liquid. Further, the filter media is disposed in the housing between the inlet and outlet ports and is operable to filter particulate matter from the liquid. Also, a pressure difference between the inlet and outlet ports with the filter media disposed in the housing is less than four pounds per square inch differential (4 psid). In addition, the system 2000 includes moving, by a pump operationally coupled to the inlet port of the filter, the liquid through the filter media of the filter with a flux rate of at least eighteen gallons per minute per square foot (18 gpm/ft$^2$) of the filter media while operating at less than one electrical horsepower (1 HPE), as represented by block 2003.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The terms "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%.

In the previous description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

It is important to recognize that it is impractical to describe every conceivable combination of components or methodologies for purposes of describing the claimed subject matter. However, a person having ordinary skill in the art may recognize that many further combinations and permutations of the subject innovations are possible. Accordingly, the claimed subject matter is intended to cover all such alterations, modifications and variations that are within the spirit and scope of the claimed subject matter.

What is claimed is:

1. A system for filtering particulate matter from a liquid, comprising:
    a filter having a filter housing, inlet and outlet ports and compressible filter media with synthetic fibers, with the filter media being disposed in the housing between the inlet and outlet ports and being operable to filter particulate matter from the liquid, wherein a pressure difference between the inlet and outlet ports with the filter media disposed in the housing is less than four pounds per square inch differential; and
    a pump operationally coupled to the inlet port of the filter and operable to move the liquid through the filter media with a flux rate of at least eighteen gallons per minute per square foot of the filter media while operating at less than one electrical horsepower.

2. The system of claim 1, wherein the pump is operable to move the liquid through the filter media with a flux rate of at least eighteen gallons per minute per square foot while the pump is operating at no more than 0.711 hydraulic horsepower.

3. The system of claim 1, wherein the pump is operable to move the liquid through the filter media with a flux rate of at least twenty gallons per minute per square foot of the filter media while the pump is operating at 0.5 electrical horsepower.

4. The system of claim 1, wherein the pump is operable to move the liquid through the filter media with a flux rate in a range of eighteen to thirty gallons per minute per square foot of the filter media while the pump is operating at less than one electrical horsepower.

5. The system of claim 1, wherein a pressure difference between the inlet and outlet ports of the filter with the filter media disposed in the housing is less than two pounds per square inch differential.

6. The system of claim 1, wherein the filter media includes a plurality of filter mediums, with each filter medium being a nonwoven sliver formed into a predetermined shape, wherein the nonwoven sliver comprises:
    first synthetic staple fibers having a first denier;
    second synthetic staple fibers having a second denier; and
    third synthetic staple fibers having a third denier.

7. The system of claim 6, wherein at least one of the first, second and third synthetic staple fibers has a different length.

8. The system of claim 6, wherein the filter media is capable of fiber migration of no more than 100 fibers for a flush volume of about 18,990 milliliters applied to the filter media having a volume of about 0.053 cubic feet.

9. The system of claim 6, wherein the filter media is capable of fiber migration of no more than 500 fibers for a flush volume of about 18,990 milliliters applied to the filter media having a volume of about 0.053 cubic feet.

10. The system of claim 6, wherein the first denier is in a range from 1 denier to 10 denier, the second denier is in a range from 10 denier to 20 denier and the third denier is in a range from 20 denier to 50 denier.

11. The system of claim 6, wherein the second denier is in a range from 10 denier to 20 denier, with the first denier being less than the second denier and the third denier being more than the second denier.

12. The system of claim 6, wherein a density of a core of each filter medium is greater than a density of an outer wrap of the filter medium.

13. The system of claim 6, wherein a composition of the nonwoven sliver includes about 10% to about 60% of the first synthetic staple fibers, about 10% to about 60% of the second synthetic staple fibers and about 10% to about 40% of the third synthetic staple fibers.

14. The system of claim 6, wherein a percentage of a volume of the first, second and third synthetic staple fibers in a volume of each filter medium is less than about 2%.

15. The system of claim 1, wherein the filter media is operable to filter the particulate matter with a grain size of at least 5 microns.

16. The system of claim 6, wherein each filter medium has a flow resistance of no more than about 50 millibars.

17. A system for filtering particulate matter from a liquid, comprising:
a filter having a filter housing, inlet and outlet ports, and cartridge-based filter media, with the filter media being disposed in the housing between the inlet and outlet ports and being operable to filter particulate matter from the liquid, wherein a pressure difference between the input and output ports is less than seven pounds per square inch differential; and
a pump operationally coupled to the input port of the filter and operable to move the liquid through the filter media of the filter with a flux rate of at least two gallons per minute per square foot of the filter media while operating at less than one electrical horsepower.

* * * * *